(12) United States Patent
Porter

(10) Patent No.: US 9,118,845 B2
(45) Date of Patent: Aug. 25, 2015

(54) METHOD, APPARATUS AND HANDSET

(75) Inventor: Robert Mark Stefan Porter, Winchester (GB)

(73) Assignee: SONY CORPORATION, Tokyo (JP)

( * ) Notice: Subject to any disclaimer, the term of this patent is extended or adjusted under 35 U.S.C. 154(b) by 432 days.

(21) Appl. No.: 13/412,138

(22) Filed: Mar. 5, 2012

(65) Prior Publication Data

US 2012/0249831 A1    Oct. 4, 2012

(30) Foreign Application Priority Data

Mar. 29, 2011    (GB) .................................. 1105218.0

(51) Int. Cl.
H04N 7/18       (2006.01)
H04N 5/272      (2006.01)
H04N 5/232      (2006.01)

(52) U.S. Cl.
CPC ........... *H04N 5/272* (2013.01); *H04N 5/23206* (2013.01); *H04N 5/23293* (2013.01)

(58) Field of Classification Search
USPC ......................................................... 348/159
See application file for complete search history.

(56) References Cited

U.S. PATENT DOCUMENTS

| 6,538,676 B1 | 3/2003 | Peters | |
|---|---|---|---|
| 2009/0290786 A1* | 11/2009 | Stevens et al. | 382/154 |
| 2010/0023878 A1* | 1/2010 | Douris et al. | 715/757 |
| 2010/0050082 A1 | 2/2010 | Katz et al. | |

FOREIGN PATENT DOCUMENTS

| GB | 2 452 508 A | 3/2009 |
|---|---|---|
| GB | 2 452 510 A | 3/2009 |

OTHER PUBLICATIONS

Shafiq ur Rehman, et al., "Turn Your Mobile Into the Ball: Rendering Live Football Game Using Vibration", IEEE Transactions on Multimedia, vol. 10, No. 6, Oct. 2008, 12 pages.

Shafiq ur Rehman, et al., "Turn Your Mobile Into the Ball Rendering Live Football Game Using Vibration", IEEE Transactions on Multimedia, vol. 10, No. 6, Oct. 2008, 12 pages.

United Kingdom Search Report issued Aug. 3, 2011, in Great Britain Application No. GB 1105218.0 filed Mar. 29, 2011.

* cited by examiner

*Primary Examiner* — Tracy Li

(74) *Attorney, Agent, or Firm* — Oblon, McClelland, Maier & Neustadt, L.L.P.

(57) ABSTRACT

A method of annotating, on a display, a plurality of objects in an image of a scene captured by a camera, the method comprising: receiving i) metadata representing the different annotations to be applied to each of the objects, and ii) position information identifying the real-world position of each object in the scene to which the annotations in the image are to be applied; determining the focal length of the camera and the tilt applied to the camera; determining the position of the camera with respect to the scene being captured; and applying the annotation to the image captured by the camera in accordance with the position information.

18 Claims, 26 Drawing Sheets

METHOD, APPARATUS AND HANDSET

BACKGROUND OF THE INVENTION

1. Field of the Invention

The present invention relates to a method, apparatus and handset.

2. Description of the Prior Art

When viewing an event or scene, it may be useful to obtain further details of the event of scene. This is sometimes referred to as augmented reality.

One problem associated with augmented reality is the speed and accuracy with which annotations are overlaid on the real-life image. It is an aim of embodiments of the present invention to address these issues.

SUMMARY OF THE INVENTION

According to a first aspect, there is provided a method of annotating, on a display, a plurality of objects in an image of a scene captured by a camera, the method comprising: receiving i) metadata representing the different annotations to be applied to each of the objects, and ii) position information identifying the real-world position of each object in the scene to which the annotations in the image are to be applied; determining the focal length of the camera and the tilt applied to the camera; determining the position of the camera with respect to the scene being captured; and
applying the annotation to the image captured by the camera in accordance with the position information.

The method may further comprise obtaining the position information from an image capture device having a field of view of the scene that is different to the camera, and wherein the position information is determined from an image of the scene captured by the image capture device.

The method may further comprise identifying at least one of the objects in the image captured by the camera in accordance with the received real-world position information of the object, the position information of the camera, the focal length of the camera and the tilt applied to the camera; and applying the annotation to the image in accordance with the identified object.

The step of identifying the object may comprise detecting the object in the image.

The method may further comprise identifying the object in accordance with a stored lens distortion characteristic of the camera.

The position information may be global positioning system location information

The one object may be either a static object located in the scene or is a unique object in the scene.

The method may further comprise storing the metadata and displaying the annotation from the stored metadata.

According to another aspect, there is provided an apparatus comprising a display and a camera, the display operative in use to display an image of a scene having a plurality of objects, the image being captured by the camera, the apparatus further comprising:
a receiving device operable to receive i) metadata representing the different annotations to be applied to each of the objects, and ii) position information identifying the real-world position of each object in the scene to which the annotations in the image are to be applied;
a determining device operable to:
determine the focal length of the camera and the tilt applied to the camera; and
determine the position of the camera with respect to the scene being captured; and the apparatus comprising a controller operable to apply the annotation to the image captured by the camera in accordance with the position information.

The apparatus may further comprise an obtaining device operable to obtain the position information from an image capture device having a field of view of the scene that is different to the camera, and wherein the position information is determined from an image of the scene captured by the image capture device.

The controller may be further operable to identify at least one of the objects in the image captured by the camera in accordance with the received real-world position information of the object, the position information of the camera, the focal length of the camera and the tilt applied to the camera: and applying the annotation to the image in accordance with the identified object.

The controller may be operable to detect the object in the image.

The controller may be further operable to identify the object in accordance with a stored lens distortion characteristic of the camera.

The position information may be global positioning system location information

The one object may be either a static object located in the scene or is a unique object in the scene.

The apparatus may further comprise a storage device operable to store the metadata and the controller is operable to display the annotation from the stored metadata.

According to another aspect, there is provided a mobile handset comprising a transceiver for connection to a network and an apparatus according to any one of the above embodiments.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
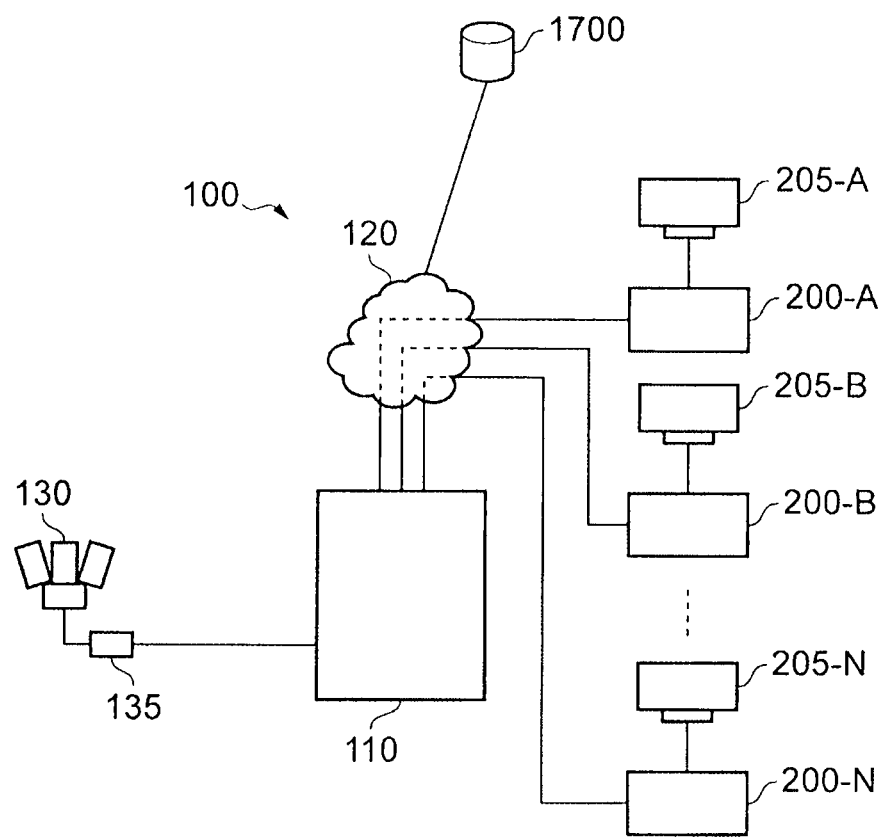
FIG. 1 shows a system according to a first embodiment of the present invention.

A system 100 is shown in FIG. 1. In this system 100, images of a scene are captured by the camera arrangement 130. In embodiments, the scene is of a sports event, such as a soccer match, although the invention is not so limited. In this camera arrangement 130, three high definition cameras are located on a rig (not shown). The arrangement 130 enables a stitched image to be generated. The arrangement 130 therefore has each camera capturing a different part of the same scene with a small overlap in the field of view between each camera. The three images are each high definition images, which, when stitched together, result in a super-high definition image. The three high definition images captured by the three cameras in the camera arrangement 130 are fed into an image processor 135 which performs editing of the images such as colour enhancement. Also, the image processor 135 receives metadata from the cameras in the camera arrangement 130 relating to camera parameters such as focal length, zoom factor and the like. The enhanced images and the metadata are fed into a server 110 of a first embodiment which will be explained later with reference to FIG. 4A or server 110' of a second embodiment which will be explained with reference to FIG. 4B.

In embodiments, the actual image stitching is carried out in the user devices 200A-N. However, in order to reduce the computational expense within the user devices 200A-N, the parameters required to perform the stitching are calculated within a server 110 to which the image processing device 135 is connected. The server 110 may be wired or wirelessly connected to the image processor 135 directly or via a network, such as a local area network, wide area network, or the Internet. The method of calculating the parameters, and actually performing the stitching, is described in GB 2444566A. Further disclosed in GB 2444566A is a suitable type of camera arrangement 130. The contents of GB 2444566A relating to the calculation of the parameters, the stitching method and the camera arrangement is incorporated herein.

As noted in GB 2444566A the camera parameters for each camera in the camera arrangement 130 are determined. These parameters include the local length and relative yaw, pitch and roll for each camera as well as parameters that correct for lens distortion, barrel distortion and the like and are determined on the server 110. Also, other parameters such as chromatic aberration correction parameters, colourimetry and exposure correction parameters required for stitching the image may also be calculated in the server 110. Moreover, as the skilled person will appreciate, there may be other values calculated in the server 110 which are required in the image stitching process. These values are explained in GB 2444566A and so, for brevity, will not be explained hereinafter. These values calculated in the server 110 are sent to each user device 200A-N as will be explained later.

In addition to the image stitching parameters being calculated within the server 110, other calculations take place. For example, object detection and segmentation takes place identifying and extracting objects in the images to which a three dimensional effect may be applied. Positional information identifying the location of each detected object within the image is also determined within the server 110.

Moreover, a depth map is generated within the server 110. The depth map allocates each pixel in the image captured by a camera with a corresponding distance from the camera in the captured scene. In other words, once the depth map is complete for a captured image, it is possible to determine the distance between the point in the scene corresponding to the pixel and the camera capturing the image. Also maintained within the server 110 is a background model which is periodically updated. The background model is updated such that different parts of the background image are updated at different rates. Specifically, the background model is updated in dependence on whether the part of the image was detected as a player in the previous frame.

Alternatively, the server 110 may have two background models. In this case, within the server 110 a long term background model and a short term background model is maintained. The long term background model defines a background in the image over a longer period of time such as 5 minutes, whereas the short term model defines a background over a shorter period such as 1 second. The use of a short and long term background model enable short term events such as lighting changes to be taken into account.

The depth map which is calculated within the server 110 is sent to each user device 200A-N. In embodiments, each camera within the camera arrangement 130 is fixed. This means that the depth map does not change over time. However, the depth map for each camera is sent to each user device 200A-N upon a trigger to allow for new user devices to be connected to the server 110. For example, the depth map may be sent out when the new user device registers with the server 110 or periodically in time. As would be appreciated, if the field of view of the cameras moved, the depth map would need to be recalculated and sent to the user devices 200A-N more frequently. However, it is also envisaged that the depth map be sent continually to each user device 200A-N.

The manner in which the depth map and background models are generated will be explained later. Further, the manner in which the object detection and object segmentation is performed will be explained later.

Also connected to the server 110 is a plurality of user devices 200A-N. These user devices 200A-N are connected to the server 110, in embodiments, over the Internet 120. However, it is understood that the invention is not so limited and that the user devices 200A-N could be connected to the server 110 over any type of network such as a Local Area Network (LAN), or may be wired to the server 110 or wirelessly connected to the server 110. Also attached to each user device is a corresponding display 205A-N. The display 205A-N may be a television, or monitor or any kind of display capable of displaying images that can be perceived by a user as being a three dimensional image.

In embodiments of the invention, the user device 200A-N is a PlayStation® 3 games console. However, the invention is not so limited. Indeed, the user device may be a set-top box, a computer or any other type of device capable of processing images.

Also connected to the server 110 and each of the user devices 200A-N via the Internet 120 is a community hub 1700 (sometimes called a network server). The construction and function of the community hub 1700 will be explained later.

Figure 2:
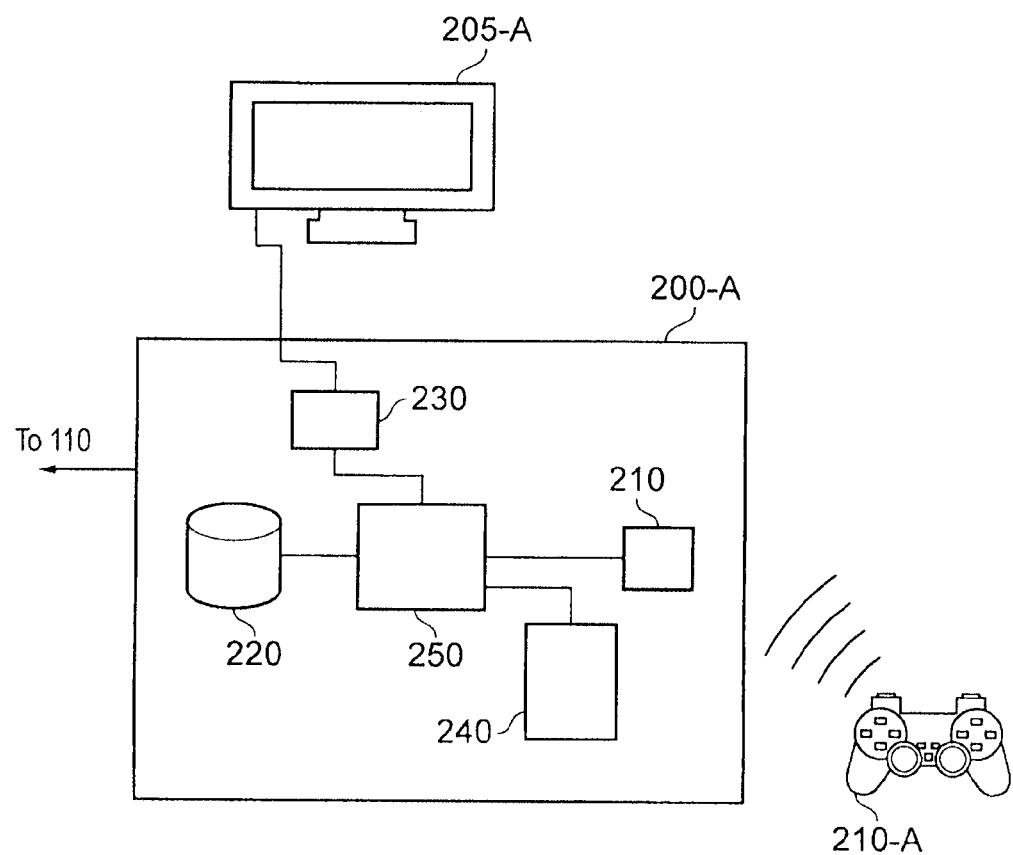
FIG. 2 shows a client device in the system of the first embodiment.

A schematic diagram of the user device 200A is shown in FIG. 2. The user device contains a storage medium 220. In embodiments of the invention, the storage medium 220 is a hard disk drive, but the invention is not limited. The storage medium may be an optical medium, or semiconductor memory or the like.

Connected to the storage medium 220 is a central processor 250. In embodiments, the central processor 250 is a Cell Processor. The Cell processor is advantageous in embodiments because it is particularly suited to complex calculations such as image processing.

Additionally connected to the central processor 250 is a wireless accessory interlace 210 which is suitable to connect to, and communicate with, a wireless accessory 210A. In embodiments, the wireless accessory 210A is a user operated device, which may be a six-axis controller, although the invention is not so limited. The six-axis controller allows a user to interact with, and control, the user device 200A.

Further, a graphics processor 230 is connected to the central processor 250. The graphics processor 230 is operable to connect to the display 205A and to control the display 205A to display a stereoscopic image.

Other processors such as an audio processor 240 are connected to the central processor 250 as would be appreciated.

Figure 3:
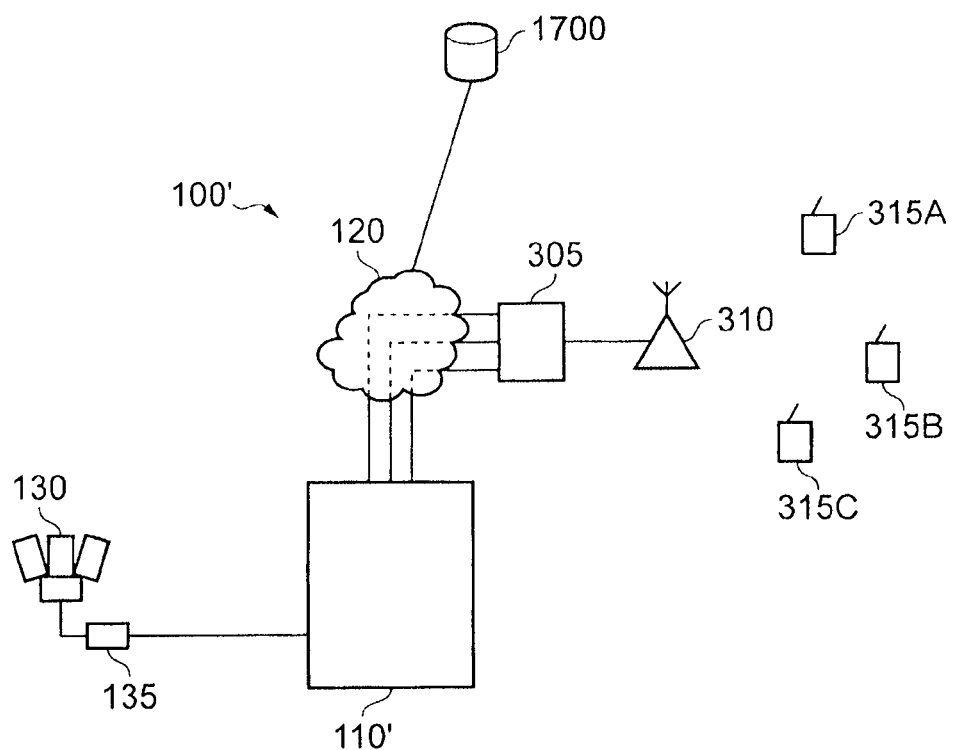
FIG. 3 shows a system according to a second embodiment of the present invention.

Referring to FIG. 3, a different embodiment of system 100 is shown. This different system is termed 100' where like numerals refer to like features and is configured to provide content over a Long Term Evolution 3GPP network. In this different embodiment, the server 110' is connected to a Serving Gateway 305 and provides content that is particularly suited for distribution over a mobile network. As the skilled person will appreciate the Serving Gateway 305 routes user data to and from a number of enhanced Node-Bs. For brevity, a single enhanced Node-B 310 is shown in FIG. 3. The enhanced Node-B 310 communicates with a plurality of user equipment 315A-C.

Figure 4A:
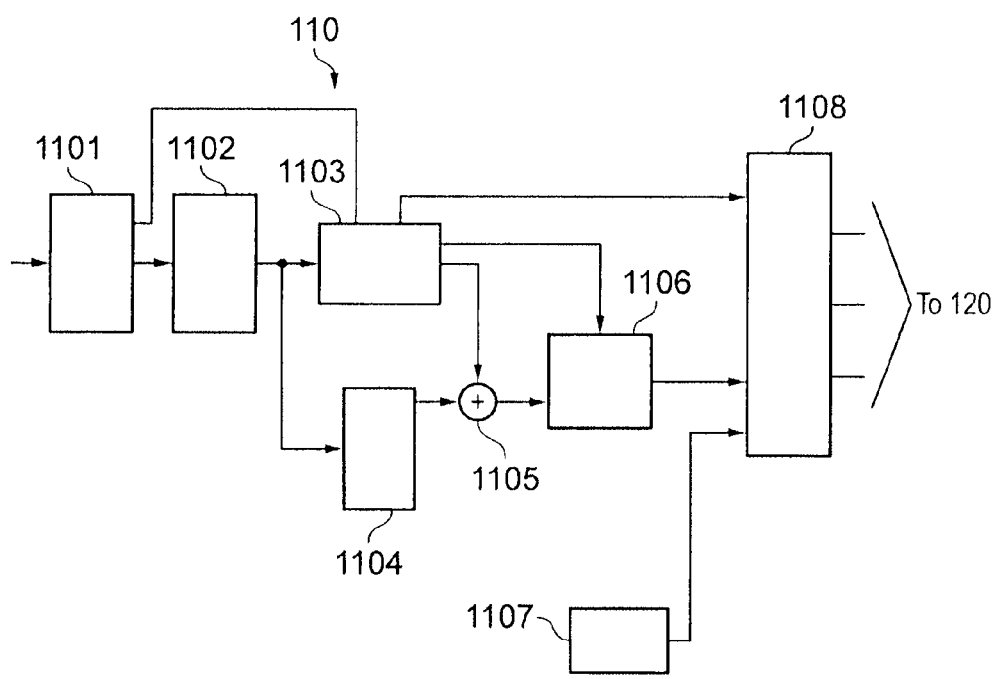
FIG. 4A shows a server of the first embodiment of the present invention.

FIG. 4A shows an embodiment of server 110. In this embodiment of FIG. 4A, the image processed by image processor 135 is fed into the image stitching device 1101. As noted above, the image stitching device 1101 generates a super High Definition picture which is composed of three separately captured images being stitched together. This is described in GB 2444566A and so will not be described hereinafter.

The stitched image is fed into a background generator 1102 which removes the foreground objects from the stitched image. In other words, the background generator 1102 generates an image that contains only the background of the stitched image. The construction and function of the background generator 1102 will be explained later. Additionally, the stitched image is fed into an object key producing device 1103. This identifies foreground objects in the stitched image and determines the position of each identified object as will be explained.

The generated background is fed into a reformatting device 1104 and into the object key producing device 1103. The reformatting device 1104 formats the generated background into a more appropriate format for transmission over the network 120 as will be explained later.

The output from the object key producing device 1103 is fed into an adder 1105 and an Advanced Video Coding (AVC) encoder 1106. In particular, one output of the object key producing device 1103 is operable to control the quantiser associated with the AVC encoder 1106. The output of the AVC encoder 1106 produces a composite stream which includes both the stitched image from the camera arrangement 130 and the extracted objects as will be explained later. The output from the object key producing device 1103 also contains metadata associated with the object. For example, the metadata may include the player name, player number or player bio information. This metadata is fed into a data stream producing device 1108 which is connected to the network 120.

The output of the reformatting device 1104 is also fed into the adder 1105. The output from the adder 1105 is fed into the AVC encoder 1106. The output from the AVC encoder 1106 is fed into the data stream producing device 1108. The data stream producing device 1108 then multiplexes the input signals together. The multiplexed stream is then converted into packets of data and transferred to the appropriate user device over the Internet 120.

Figure 4B:
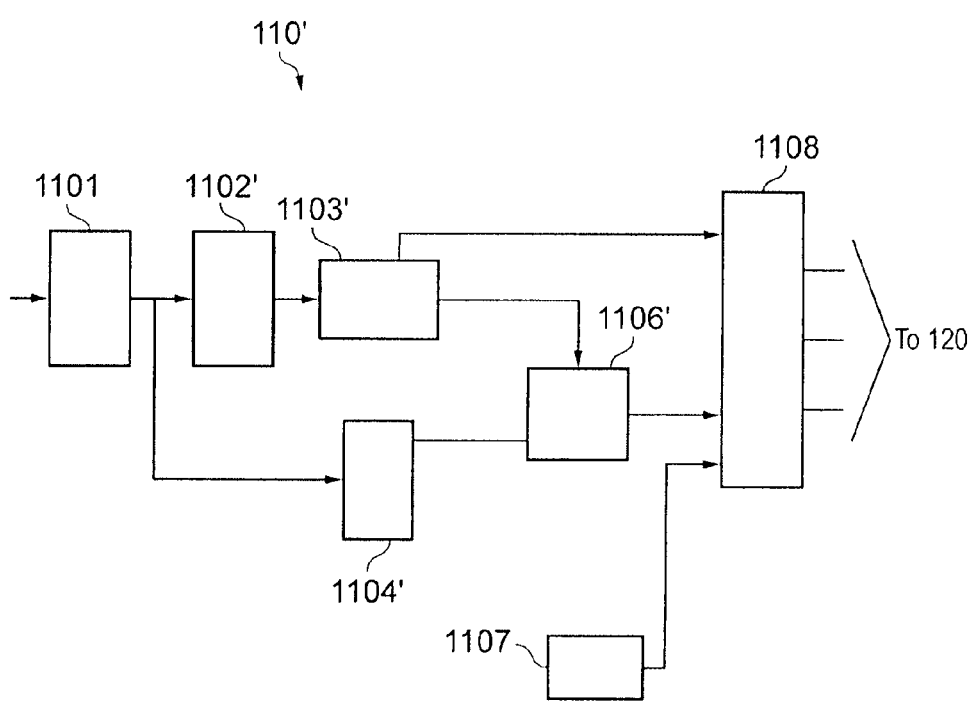
FIG. 4B shows a server of the second embodiment of the present invention.

FIG. 4B shows the alternative server 110'. In the alternative server 110' many components are the same as that discussed in relation to FIG. 4A. These identical components have the same reference numerals. However, the background generator 1102' in this embodiment has no output to the reformatting device 1104'. Instead, the output from the image stitching device 1101 is fed to both the background generator 1102' and the reformatting device 1104'.

Moreover, in the alternative server 110', there is no adder. Instead, the output from the reformatting device 1104' is fed directly into the AVC encoder 1106'. Moreover, the object key producing device 1103' in this embodiment does not produce the composite image as produced in the embodiment of FIG. 4A.

User Registration

Figure 5:
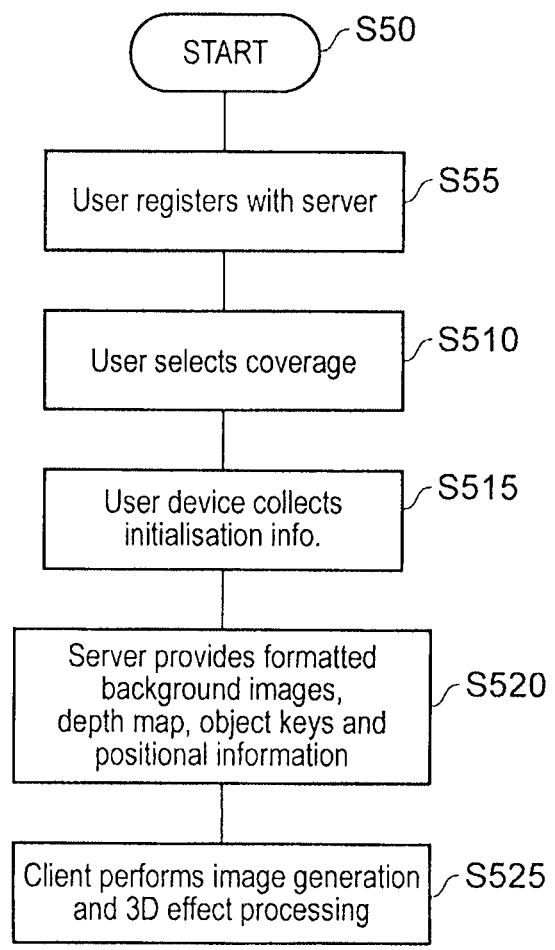
FIG. 5 shows a flow chart explaining the registration process of the client device to the server according to either the first or second embodiment.

Before any content is sent from the server 110 to any user device 200A-N or from alternative server 110' to user equipment 315A-C, the respective device or equipment needs to be registered with the appropriate server. The following relates to registration of a user device 200A with the server 110 and is explained in FIG. 5. It should be noted that the user equipment will be registered with the alternative server 110' in the same manner.

When the user switches on a user device 200A, the user uses the wireless accessory 210A to select a particular event they wish to view on the display 205A. This event may be a pop concert, sporting event, or any kind of event. In the following example the event is a soccer match. This selection is the start step S50.

In order to view the event, the user may need to pay a one off fee, or the event may be part of a subscription package. This fee or package may be purchased by entering credit card details in the user device 200A prior to viewing the event. Alternatively, the event may be purchased through any other means or indeed, the event may be free. In order to view the event, the user will need to register with the server 110. The user device 200A therefore acts as a client device with respect to the server 110. This registration takes place in step S55 and allows the server 110 to obtain the necessary information from the user device 200A such as IP address and the like enabling communication to take place between the server 110 and the user device 200A. Moreover, other information may be collected at this stage by the server 110 such as information relating to the event to be viewed by the user which allows targeted advertising for that user to take place.

After registration, the user confirms the event they wish to view in step S510 and confirms payment details.

In step S515, the user device 200A receives initialisation information from both the server 110 and the display 205A. The initialisation information from the display 205A may include information relating to the size of the screen. This may be obtained directly from the display 205A or input by the user. The initialisation information from the server 110 may include the depth map. The initialisation information may be provided in response to a request from the user device 200A or may be transferred from the server 110 in response to the registration. Alternatively, the initialisation information may be transferred periodically to each user device 200A connected to the server 110. It should be noted here that the depth map only needs to be provided once to the user device 200A because the camera arrangement 130 is fixed. In the event that the camera arrangement 130 is movable, then the initialisation information would be provided more regularly. The initialisation information is stored in the storage medium 220 within the user device 200A.

In step S520, the server 110 provides the formatted high definition images of the background which have been generated from the images stitched together in the image stitching device 1101. The central processor 250 of the user device 200A uses the formatted background images to generate an ultra-high definition image for display. Additionally, the processor 250 generates a left and right version of the ultra-high definition image and/or a variable field of view of the ultra-high definition image to display a 3D (or stereoscopic) representation of the ultra-high definition image or the field of view of the image.

As noted here, the user can also determine the field of view they wish to have of the event. This field of view would be selected using the interface 210A. The method used by the user device 200A to allow an appropriate field of view to be selected is also described in GB 2444566A.

Additionally, for each captured image, the server 110 analyses the image to detect objects in the image. This detection is performed in the object key producing device 1103, the function of which is discussed below. After detection of the objects in the image, an object block is produced. The object block contains the foreground objects. This will be explained later. Also produced is positional data identifying where in the image the extracted object is located. This is also discussed later.

The high definition background images, the segmented objects within the image and the positional data are sent to the user device 200A.

After the user device 200A receives the aforesaid information from the server 110, the user device 200A generates the ultra-high definition image. This is step S325. Additionally, using the depth map, the isolated object blocks and the positional data of the detected object in the image, the user device 200A applies the three dimensional effect to the ultra-high definition image. Further, other metadata is provided to the user device 200A. In order to improve the user's experience, the object metadata, such as player information is provided. Moreover, along with each object block, macroblock numbers may be provided. This identifies the macroblock number associated with each object block. This reduces the computational expense within the user device 200A of placing the object block on the background image.

With regard to the alternative server 110', similar information is provided to the user equipment 320A. However, in this embodiment, the reformatted captured and stitched image (rather than the reformatted background image with the embodiment of server 110) is provided. Additionally, the object blocks are not provided as no additional three dimensional effect is applied to the detected objects in this embodiment.

Object Detection and Tracking

Object tracking in accordance with examples of the present invention will now be described with reference to FIGS. 6, 7 and 8. In particular, the following object detection and tracking refers to server 110. However, the same object detection and tracking technique is used in the alternative server 110'.

Figure 6:
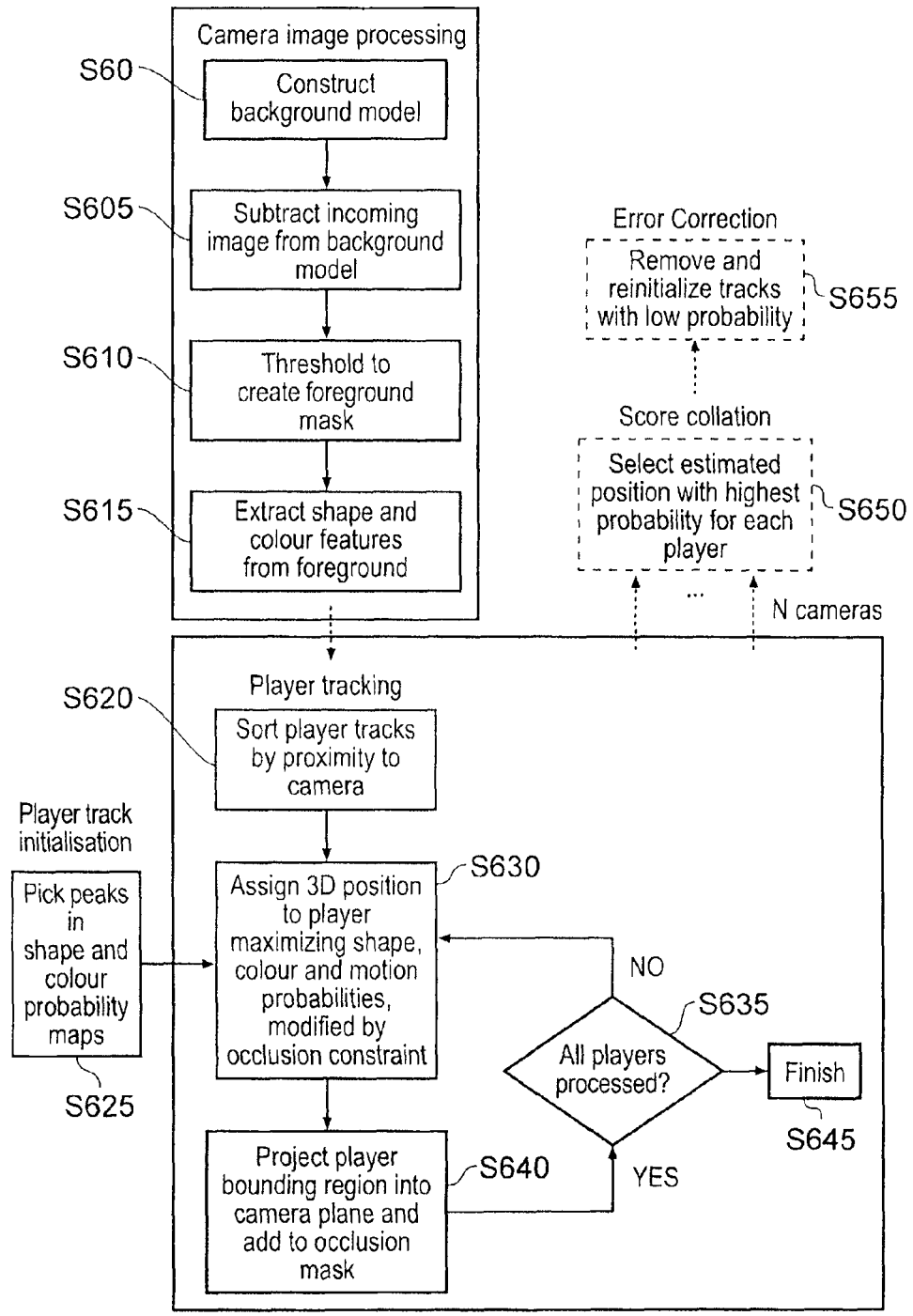
FIG. 6 shows a flowchart of a method of object tracking in accordance with examples of the present invention applicable to both the first and second embodiments.

FIG. 6 shows a flowchart of a method of object tracking in accordance with examples of the present invention. In order to track an object, a background model is constructed from those parts of the received video that are detected as being substantially static over a predetermined number of frames. In a first step S60 the video image received from one camera within the arrangement 130, which represents the soccer pitch is processed to construct the background model of the image. The background model is constructed in order to create a foreground mask which assists in identifying and tracking the individual players. The foreground mask will be used to generate the object keys explained later. The background model is formed at step S60 by determining for each pixel a mean of the pixels and a variance of the pixel values between successive frames in order to build the background model. Thus, in successive frames where the mean value of the pixels do not change greatly these pixels can be identified as background pixels in order to identify the foreground mask.

Such a background/foreground segmentation is a process which is known in the field of image processing and the present technique may utilise an algorithm described in document by Manzanera and Richefeu, and entitled "A robust and Computationally Efficient Motion Detection Algorithm Based on $\Sigma$-$\Delta$ Background Estimation", published in proceedings ICVGIP. 2004. However, the present technique should not be taken as being limited to this known technique and other techniques for generating a foreground mask with respect to a background model for use in tracking are also known.

It will be appreciated that, in the case where the field of view of the video camera encompasses some of the crowd, the crowd is unlikely to be included in the background model as they will probably be moving around. This is undesirable because it is likely to increase a processing load on the Cell processor when carrying out the object tracking as well as being unnecessary as most sports broadcasters are unlikely to be interested in tracking people in the crowd.

In an example of the present invention, a single background model may be constructed or indeed two background models may be constructed. In the event that a single background model is constructed, different parts of the background are updated at different rates depending on whether a player was detected at such a position in the previous frame. For example, where a player exists in the previous frame, the background may be updated less frequently so that the player does not become part of the background image.

Alternatively, in the event that two background models are created, one model may be constructed at the start of the game and can even be done before players come onto the pitch. This is termed the long-term background model. Additionally, another background model is recalculated periodically throughout the game so as to take account of any changes in lighting condition such as shadows that may vary throughout the game. This is the short term background model. Both the background model created at the start of the game and the background model re-calculated periodically are stored in the server 110 in a storage medium (not shown). For the following explanation, the single background model is used.

In step S605, the background model is subtracted from the incoming image from the camera to identify areas of difference. Thus the background model is subtracted from the image and the resultant image is used to generate a mask for each player. In step S610, a threshold is created with respect to the pixel values in a version of the image which results when the background model has been subtracted. The background model is generated by first determining the mean of the pixels over a series of frames of the video images. From the mean values of each of the pixels, the variance of each of the pixels can be calculated from the frames of the video images. The variance of the pixels is then used to determine a threshold value, which will vary for each pixel across all pixels of the video images. For pixels, which correspond to parts of the image, where the variance is high, such as parts which include the crowd, the threshold can be set to a high value, whereas the parts of the image, which correspond to the pitch will have a lower threshold, since the colour and content of the pitch will be consistently the same, apart from the presence of the players. Thus, the threshold will determine whether or not a foreground element is present and therefore a foreground mask can correspondingly be identified. In step S615 a shape probability based on a correlation with a mean human shape model is used to extract a shape within the foreground mask. Furthermore, colour features are extracted from the image in order to create a colour probability mask, in order to identify the player, for example from the colour of the player's shirt. Thus the colour of each team's shirts can be used to differentiate the players from each other. To this end, the server 110 generates colour templates in dependence upon the known colours of each football team's team kit. Thus, the colour of the shirts of each team is required, the colour of the goal keeper's shirts and that of the referee. However, it will be appreciated that other suitable colour templates and/or template matching processes could be used. The background generation explained above is carried out in the background generator 1102.

Returning to FIG. 6, in step S615 the server 110 compares each of the pixels of each colour template with the pixels corresponding to the shirt region of the image of the player. The server 110 then generates a probability value that indicates a similarity between pixels of the colour template and the selected pixels, to form a colour probability based on distance in hue saturation value (HSV) colour space from team and pitch colour models. In addition, a shape probability is used to localise the players, which is based on correlation with a mean human shape model. Furthermore, a motion probability is based on distance from position predicted by a recursive least-squares estimator using starting position, velocity and acceleration parameters.

Figure 7A:
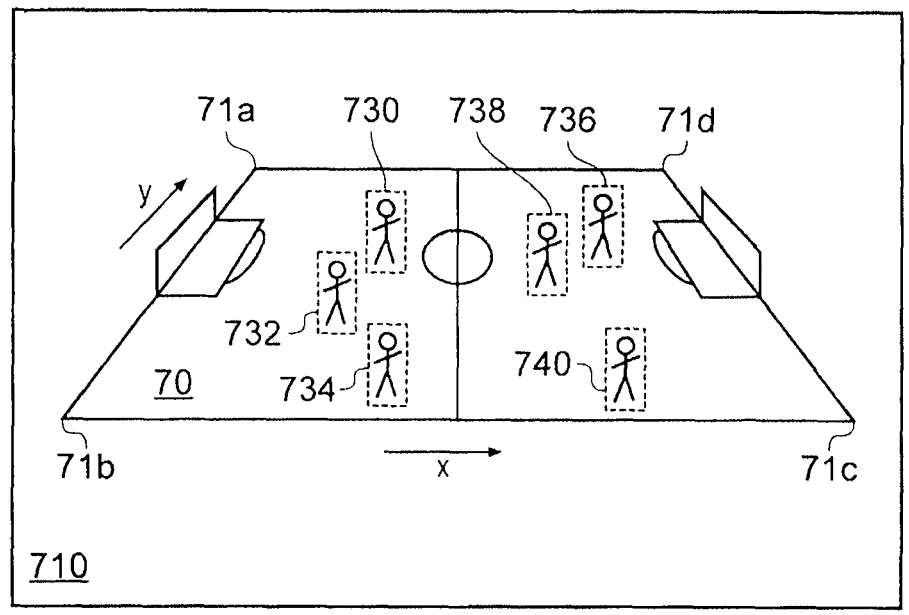
FIG. 7A shows the creation of object keys in accordance with both the first and second embodiment of the present invention.

The creation of object keys by the object key creation device 1106 is illustrated in FIG. 7A. FIG. 7A shows a camera view 710 of the soccer pitch generated by one of the cameras in the arrangement 130. As already explained, the pitch forms part of the background model, whilst the players 730, 732, 734, 736, 738, 740 should form part of the foreground mask and be each respective as described above. Player bounding boxes, which may be termed the rectangular outline, are shown as the dotted lines around each player.

Thus far the steps S60, S605, S610 and S615 are performed with respect to the camera image processing. Having devised the foreground mask, player tracking is performed after first sorting the player tracks by proximity to the camera in step S620. Thus, the players which are identified as being closest to the camera are processed first in order to eliminate these players from the tracking process. At step S630, player positions are updated so as to maximise shape, colour and motion probabilities. In step S640 an occlusion mask is constructed that excludes image regions already known to be covered by other closer player tracks. This ensures that players partially or wholly occluded by other players can only be matched to visible image regions. The occlusion mask improves tracking reliability as it reduces the incidence of track merging (whereby two tracks follow the same player after an occlusion event). This is a particular problem when many of the targets look the same, because they cannot be (easily) distinguished by colour. The occlusion mask allows pixels to be assigned to a near player and excluded from the further player, preventing both tracks from matching to the same set of pixels and thus maintaining their separate identities.

Figure 7B:
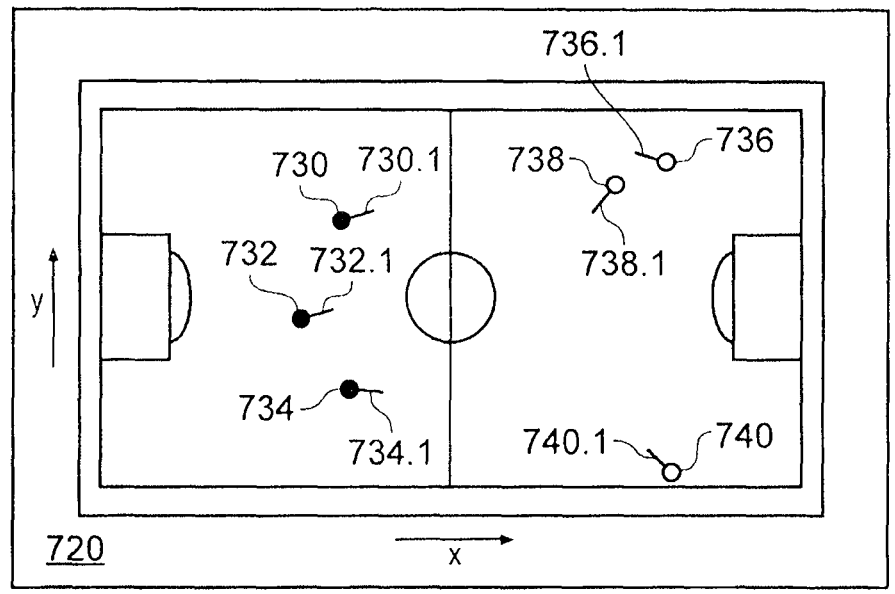
FIG. 7B shows the addition of directional indication to a 3D model of the pitch according to both the first and second embodiment of the present invention.

There then follows a process of tracking each player by extracting the features provided within the camera image and mapping these onto a 3D model as shown in FIGS. 7A and 7B. Thus, for a corresponding position within the 2D image produced by the camera, a 3D position is assigned to a player which maximises shape, colour and motion probabilities. As will be explained shortly, the selection and mapping of the player from the 2D image onto the 3D model will be modified should an occlusion event have been detected. To assist the mapping from the 2D image to the 3D model in step S625 the players to be tracked are initialised to the effect that peaks in shape and colour probability are mapped onto the most appropriate selection of players. It should be emphasised that the tracking initialisation, which is performed at step S625 is only performed once, typically at the start of the tracking process. For a good tracking initialisation of the system, the players should be well separated. After tracking initialisation any errors in the tracking of the players are corrected automatically in accordance with the present technique, which does not require manual intervention.

In order to effect tracking in the 3D model from the 2D image positions, a transformation is effected by use of a projection matrix P. Tracking requires that 2D image positions can be related to positions within the 3D model. This transformation is accomplished by use of a projection (P) matrix. A point in 2D space equates to a line in 3D space:

$$\begin{bmatrix} x \\ y \\ 1 \end{bmatrix} = \begin{bmatrix} P_{00} & P_{01} & P_{02} & P_{03} \\ P_{10} & P_{11} & P_{12} & P_{13} \\ P_{20} & P_{21} & P_{22} & P_{23} \\ 0 & 0 & 0 & 1 \end{bmatrix} \begin{bmatrix} x' \\ y' \\ z' \\ w \end{bmatrix}$$

A point in a 2D space equates to a line in a 3D space because a third dimension, which is distance from the camera, is not known and therefore would appear correspondingly as a line across the 3D model. A height of the objects (players) can be used to determine the distance from the camera. A point in 3D space is gained by selecting a point along the line that lies at a fixed height above the known ground level (the mean human height). The projection matrix P is obtained a priori, once per camera before the match by a camera calibration process in which physical characteristics of the pitch such as the corners 71a, 71b, 71c, 71d of the pitch 70 are used to determine the camera parameters, which can therefore assist in mapping the 2D position of the players which have been identified onto the 3D model. This is a known technique, using established methods. In terms of physical parameters, the projection matrix P incorporates the camera's zoom level, focal centre, 3D position and 3D rotation vector (where it is pointing).

The tracking algorithm performed in step S630 is scalable and can operate on one or more cameras, requiring only that all points on the pitch are visible from at least one camera (at a sufficient resolution).

In addition to the colour and shape matching, step S630 includes a process in which the motion of the player being tracked is also included in order to correctly identify each of the players with a greater probability. Thus the relevant movement of players between frames can be determined both in terms of a relevant movement and in a direction. Thus, the relative motion can be used for subsequent frames to produce a search region to identify a particular player. Furthermore, as illustrated in FIG. 7B, the 3D model of the football pitch can be augmented with lines 730.1, 732.1, 734.1, 736.1, 738.1, 740.1 which are positioned relative to the graphic indication of the position of the players to reflect the relative direction of motion of the players on the football pitch.

At step S640, once the relative position of the players has been identified in the 3D model then this position is correspondingly projected back into the 2D image view of the soccer pitch and a relative bound is projected around the player identified from its position in the 3D model. Also at step S640, the relative hound around the player is then added to the occlusion mask for that player.

FIG. 7B shows a plan view of a virtual model 220 of the soccer pitch. In the example shown in FIG. 7B, the players 730, 732, and 734 (on the left hand side of the pitch) have been identified by the server 110 as wearing a different coloured football shirt from the players 736, 738, and 740 (on the right hand side of the pitch) thus indicating that they are on different teams. Differentiating the players in this way makes the detection of each player after an occlusion event easier as they can easily be distinguished from each other by the colour of their clothes.

Referring hack to FIG. 6, at a step s630, the position of each player is tracked using known techniques such as Kalman filtering, although it will be appreciated that other suitable techniques may be used. This tracking takes place both in the camera view 710 and the virtual model 720. In an example of the present invention, velocity prediction carried out by the server 110 using the position of the players in the virtual model 720 is used to assist the tracking of each player in the camera view 710.

Steps S630 and S640 are repeated until all players have been processed as represented by the decision box S635. Thus, if not all players have been processed then processing proceeds to step S630 whereas if processing has finished then the processing terminates at S645.

As shown in FIG. 6, the method illustrated includes a further step S650, which may be required if images are produced by more than one camera. As such, the process steps S60 to S645 may be performed for the video images from each camera. As such, each of the players will be provided with a detection probability from each camera. Therefore, according to step S650, each of the player's positions is estimated in accordance with the probability for each player from each camera, and the position of the player estimated from the highest of the probabilities provided by each camera, so that the position with the highest probability for each player is identified as the location for that player. This position is the position data mentioned above.

If it has been determined that an error has occurred in the tracking of the players on the soccer pitch then the track for that player can be re-initialised in step S655. The detection of an error in tracking is produced where a probability of detection of a particular player is relatively low for a particular track and accordingly, the track is re-initialised.

A result of performing the method illustrated in FIG. 6 is to generate path data for each player, which provides a position of the player in each frame of the video image, which represents a path that that player takes throughout the match. This calculated position is the position data that is sent to the user device 200A. Thus the path data provides position with respect to time.

Figure 8:
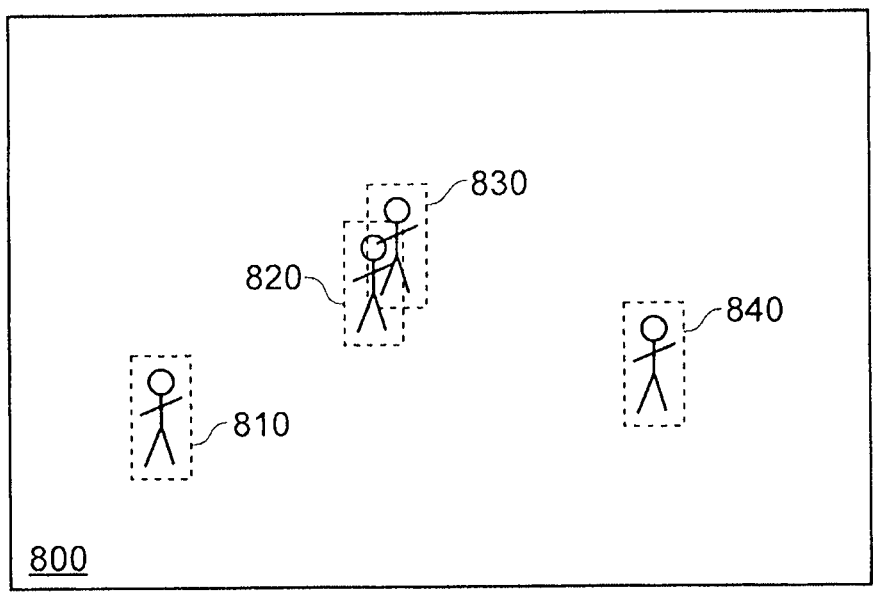
FIG. 8 shows a plurality of players and their associated bounding boxes according to both the first and second embodiments of the present invention.

A problem may arise when tracking the position of each player from a single camera view if one player obscures a whole or part of another player as illustrated in FIG. 8.

FIG. 8 shows a plurality of players 810, 820, 830, and 840 and their associated bounding boxes as indicated by the dashed lines around each player. Whilst the players 810 and 840 are clearly distinguishable from each other, player 820 obscures part of player 830. This is a so called occlusion event. An occlusion event can occur when all or part of one player obscures all or part of at least one other player with the effect that the tracking of the players becomes ambiguous, even after other factors, such as a relative motion and direction of the players is taken into account. However, it will be appreciated that occlusion events in which two or more players are involved may occur.

To detect an occlusion event, the server 110 detects whether all or part of a mask associated with a player occurs in the same image region as all or part of a mask associated with another player as shown in FIG. 8. In the case where players involved in an occlusion event are on opposing teams and thus have different coloured shirts, they may easily be distinguished and tracked accordingly. However, after the occlusion event, if the players are both on the same side, the server 110 may not be able to distinguish which player is which, particularly because their motion after an occlusion event, which was caused for example by a collision, may not be predictable and therefore may not track the players correctly. As a result, a tracking path assigned to each player may become swapped.

In order to resolve an ambiguity in the players tracked, the server 110 labels all players involved in the occlusion event with the identities of all those players involved in the occlusion event. Then, at a later time, if one or more of the players become easily distinguishable, the server 110 uses this information to reassign the identities of the players to the correct players so as to maintain a record of which player was which. This process is described in more detail with reference to FIG. 9.

Figure 9:
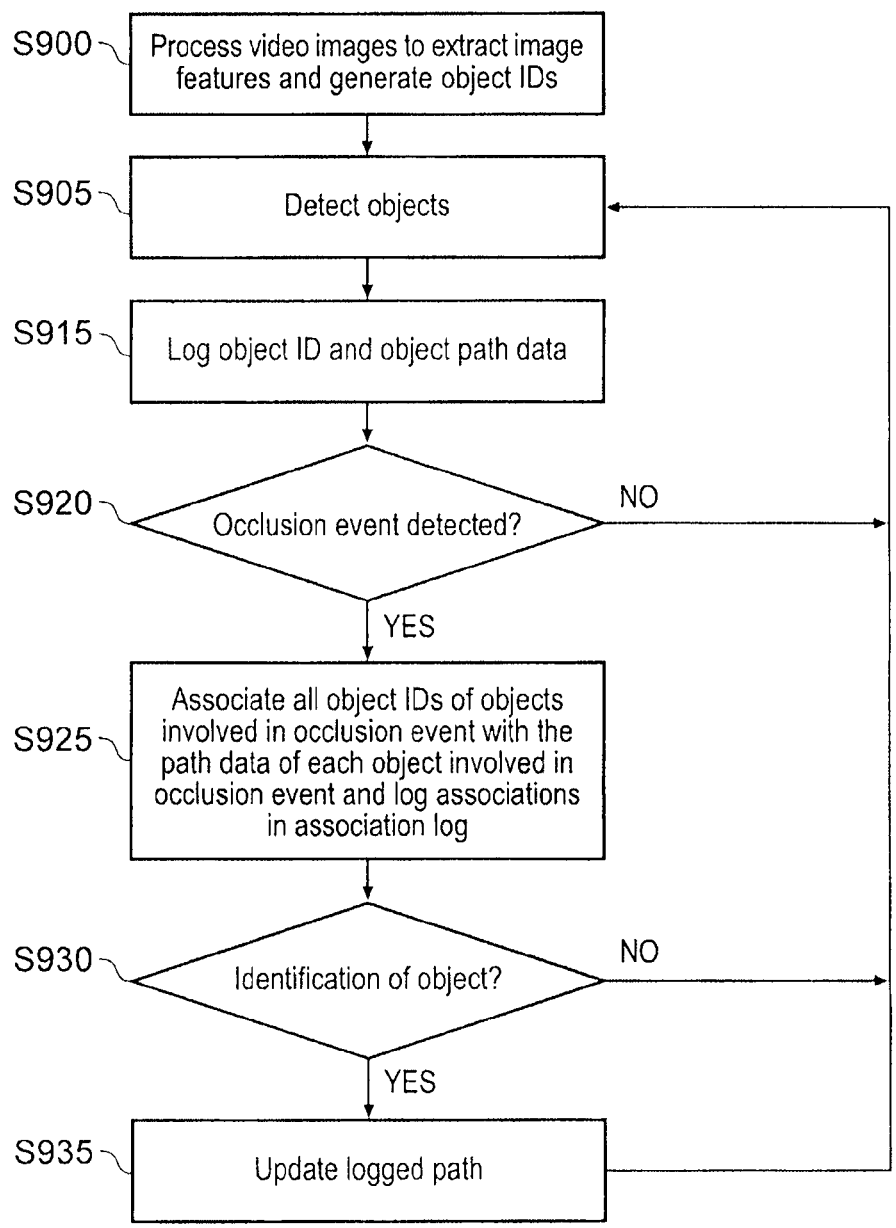
FIG. 9 shows a flow diagram of a method of object tracking and occlusion detection in accordance with both the first and second embodiments of the present invention.

FIG. 9 shows a flow diagram of a method of object tracking and occlusion detection in accordance with examples of the present invention.

At a step s900, the server 110 carries out image processing on the captured video images so as to extract one or more images features as described above with reference to FIG. 6 above. The extracted image features are then compared with corresponding image features that are extracted from possible examples of the objects so as to identify each object. In an example, players are identified from the number on the shirt. The server 110 then generates object identification for each object which identities each object. This identification is stored as metadata in conjunction with the image and the position information. Alternatively, in an example, each object (e.g. a player) is identified by an operator via an operator interface. The server 110 then uses the data input from the operator interface to generate the object identification data. However, it will be appreciated by the skilled person that image recognition techniques could be combined with identification by the operator so as to generate the object identification data or that other suitable object identification methods could be used, such as number recognition, which identifies the players by the numbers on the back of their shirts.

At a step s905, the server 110 detects any objects to be detected such as the players as described with reference to FIG. 6 above in dependence upon the one or more image features extracted at the step s900. As was mentioned above, each player is also tracked using both the virtual model 720 and the camera view 710. The server 110 uses the data generated during the tracking process to generate and store object path data that describes the path that each object takes within the received video images. The object path data takes the form of a sample of the x-y coordinates of the player with respect to time. In an example of the present invention, the path data has the format $(t_i, x_i, y_i)$, where $t_i$ is the sample time, and $x_i$ and $y_i$ are the x and y coordinates of the object at the sample time $t_i$. However, it will be appreciated that other suitable path data formats could be used.

At the step s915, the server 110 logs the object identification data for each object together with object path data which relates to the path that each object has taken within the video images. The logged data is stored on a hard disk drive (HDD) or in dynamic random access memory (DRAM) of the server 110. This allows a record to be kept of which player was associated with each detected and tracked path. The logged data can then be used to generate data about each player and where they were during the match. For example, the time that a player spent in a particular area of the pitch could be generated from the data stored in the association log. This information may be sent to the user devices 200A during or at the end of the match, and may be displayed to the user should they wish. In embodiments of the invention, the displayed logged data may include distance covered by a player or the like. This will be chosen by the user of the user device 200A. Furthermore, if for any reason the association between the player and the path becomes ambiguous, for example as might happen after an occlusion event, a record of this can be kept until the ambiguity is resolved as described below. An example of the logged object identification data together with the object path data is shown in Table 1 below.

TABLE 1

| ObjectID | t | x | y |
|---|---|---|---|
| A | $t_1$ | $x_1$ | $y_1$ |
| A | $t_2$ | $x_2$ | $y_2$ |
| A | $t_3$ | $x_3$ | $y_3$ |
| . | . | . | . |
| . | . | . | . |
| . | . | . | . |
| A | $t_i$ | $x_i$ | $y_i$ |

The association between the object identification data for each object and the object path data for that object allows each object to be tracked and identified accordingly. In the examples described above, each player may be tracked, therefore allowing a broadcaster to know which player is which even though that player might be too far away to be visually identified by an operator or by image recognition carried out by the server 110. This allows a broadcaster to incorporate further features and information based on this association that a viewer of the broadcast content might find desirable. At a step s920, the server 110 detects whether an occlusion event has occurred as described above with reference to FIG. 6. If no occlusion event is detected, then the process returns to the step s905 in which the objects are detected. In this way each object can be individually tracked and the path of each object uniquely associated with the identity of that object.

However, if an occlusion event is detected, then, at a step s925, the server 110 associates the object identification data for each object involved in the occlusion event with the object path data for each object involved in the occlusion event. For example, if two objects labelled A and B are associated with paths P and Q respectively, after the detection of an occlusion event involving objects A and B, the path P will be associated with both A and B and the path Q will be associated with both A and B. The associations generated by the server 110 after the occlusion event are then logged as described above. This allows the objects (e.g. players) involved in the occlusion event to be tracked without having to re-identify each object even if there is some uncertainty as to which player is which. Therefore, a processing load on the server 110 is reduced as only those objects involved in the occlusion event are identified ambiguously, whilst objects not involved in the occlusion event can still be identified.

At a step s930, the server 110 cheeks to see if an identification of one or more of the objects involved in the occlusion event has been made so that the identity of the objects associated with the generated paths can be resolved. The identification of at least one of the objects is carried out by the server 110 by comparing one or more image features associated with that object with the image features extracted from the possible examples of the objects. If no identification has been made, then the process passes to the step s905 with the generated path data for each object being associated with all those objects involved in the occlusion event.

However, if an identification of one or more of the objects involved in the occlusion event is detected to have occurred, then at a step s935, the logged path data is updated to reflect the identity of the object that was positively identified. In the example given above, the association log would be updated so that A is associated with path P, and B is associated with path Q.

Alternatively, an identification of an object may be carried out by an operator via an operator interface, by the server 110 using image recognition techniques in accordance with examples of the present invention (as described below) or by a combination of the two techniques. However, it will be appreciated that any other identification technique suitable to distinguish or identify each object could be used. In the case of image recognition the server 110 may generate a confidence level that indicates how likely the identification made by the image recognition process is to be correct. In an example of the present invention, an identification is determined to be where the confidence level is greater than a predetermined threshold. Additionally, an operator may assign a confidence level to their identification and, if that confidence level exceeds a predetermined threshold, then an identification is detected.

In examples of the present invention, a history of events is generated indicating when the logged path data has been updated and this may also be stored so as to act as back-up in case the positive identification turns out to be incorrect. For example, an identification could turn out to be incorrect where an operator was convinced that a player that was far away from camera arrangement 130 had a particular identity but as the player came closer to the video camera (allowing the user to see a higher resolution image of the player), the operator realises they have been mistaken. In this case, they may use the operator interface to over-ride their previous identification of the player so as that the server 110 can update the logged path data accordingly. In the example given above, an identification event history can be stored on a hard disk drive (HDD) or in dynamic random access memory (DRAM) of the server 110 with data showing that, before the positive identification, the path P used to be associated with both A and B and the path Q used to be associated with both A and B.

The identification event history can also include the confidence level that was generated during the identification process. If a subsequent identification is made of an object that has a higher confidence level than that of a previous positive identification, then the confidence level of the subsequent identification can be used to verify or annul the previous identification.

It will be appreciated that after the detection of an occlusion event, an object may be identified at any time after the occlusion event so as to disambiguate the objects involved in the occlusion event. Therefore, after the detection of an occlusion event, the server 110 can monitor whether a positive identification of an object has occurred as a background process that runs concurrently with the steps s105 to s125.

Some examples of object tracking and occlusion detection in accordance with examples of the present invention will now be described with reference to FIGS. 10*a* and 10*b*.

Figure 10A:
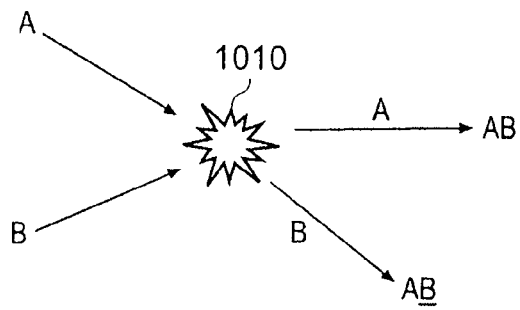
FIGS. 10A and 10B show some examples of object tracking and occlusion detection in accordance with the first and second embodiment of the present invention.

In the example shown in FIG. 10*a*, two objects identified as A and B are involved in an occlusion event 1010. After the occlusion event both detected object paths as indicated by the arrows are associated with both A and B (AB). Some time later, object B is positively identified as indicated by A<u>B</u> on the lower path. This identification is then used to update the association between the object and the paths so that object A is associated with the upper path after the occlusion event 1010 and object B is associated with the lower path after the occlusion event 1010.

Figure 10B:
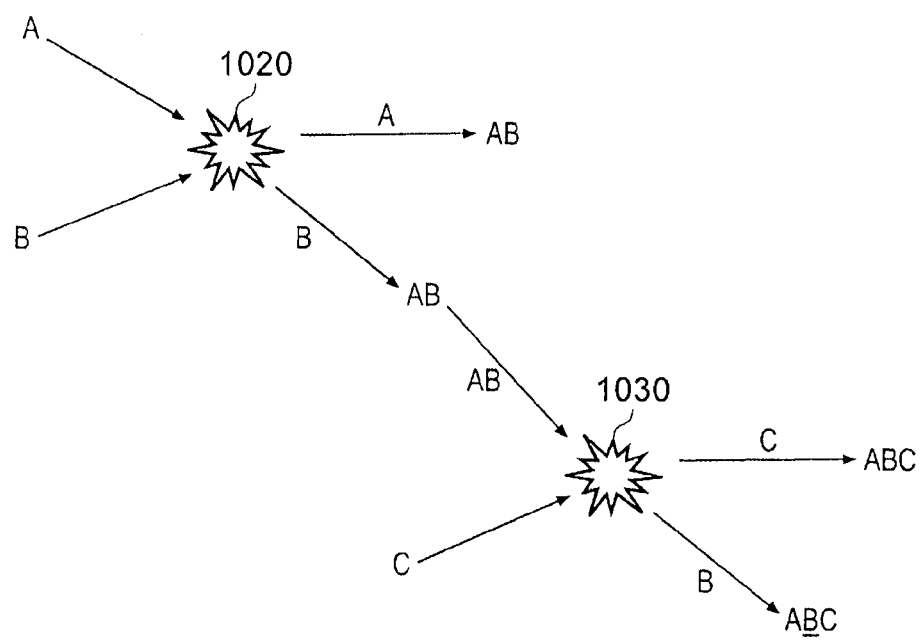

In the example shown in FIG. 10*b*, objects A and B are initially involved in an occlusion event 420. However, before the objects A and B can be positively identified, the object associated with both A and B on the lower path after the occlusion event 1020 is involved in another occlusion event 1030 with object C. Accordingly, before the occlusion event 1030, it is unclear whether the object on the lower path after the occlusion event 1020 is object A or object B. Therefore, after the occlusion event 1030, both the upper and lower paths that the two objects follow are associated with the objects A, B and C (ABC).

At a later time, the object on the lower path alter occlusion event 1030 is positively identified as being object B (A<u>B</u>C). Therefore, association log can be updated so that the upper path after occlusion event 1030 is associated with object C. Furthermore, this information can be used to update the association log so that the two objects involved in the occlusion event 1020 can be disambiguated as it must have been object B that was involved in the occlusion event 1030 as object B was positively identified as being associated with the lower path after occlusion event 1030. Accordingly, the association log can be updated so that the upper path after the occlusion event 1020 is associated with the object A and the lower path after occlusion event 1020 associated with object B.

Therefore, examples of the present invention allow objects to be associated with tracked paths of objects even though several occlusion events may have occurred before an object is positively identified. Furthermore, examples of the present invention allow the identities of the different objects to be cross referenced with each other so as to allow each path to be associated with the correct object.

In some examples, data representing the starting position of objects may be used to initialise and verify the object tracking. Taking soccer as an example, players are likely to start a match in approximately stationary positions on the field of play. Each player is likely to be positioned within a threshold distance from a particular co-ordinate on the field of play. The starting positions may depend on the team formation such as 4-4-2 (four in defence, four in midfield, two in attack) or 5-3-2, and also which team is kicking off and which team is defending the kick-off. Similar positions are likely to be adopted by players from a goal-kick taken from the ground. Such position information can be used to initiate player tracking, for example by comparing position data with a team-sheet and formation information. Such position information may also be used to correct the path information when an occlusion event has occurred. Using the team formation information is advantageous because this can be reset by an operator during the course of a match should changes in team formation become apparent, e.g. after a substitution or a sending off. This will improve the accuracy and reliability of the object tracking.

The position of each object (or in this example, player) within the ultra-high definition image is established. Additionally, the block around each player illustrated in FIG. 7A as boxes 730 to 740 respectively is established. Each block will contain the image of the player and so will be referred to as a "player block". When the image is encoded using the AVC encoder 1106', the player block will form one or more macroblocks within the image. As the player block will be of importance to the user and also to the creation of the stereoscopic image on the user device, the macroblock address of the player block within the image is generated by the object key generator 1103'. The object key generator 1103 provides the macroblock address to the quantisation control within the object key generator 1103' which ensures that the player blocks are encoded to a high resolution compared with the rest of the image. This ensures that the bandwidth of the network over which the encoded image is transferred is most efficiently used.

It should be noted here that in the object key generator 1103 of server 110, in addition to the object position and the macroblock number being generated, the contents of the player block is extracted from the ultra-high definition image. In other words, in the object key generator 1103 the individual players are extracted from the ultra-high definition image. However, in the object key generator 1103' of the alternative server 110', only the position and macroblock number are generated and the contents of the player block are not extracted.

Reformatting Device

Figure 11:
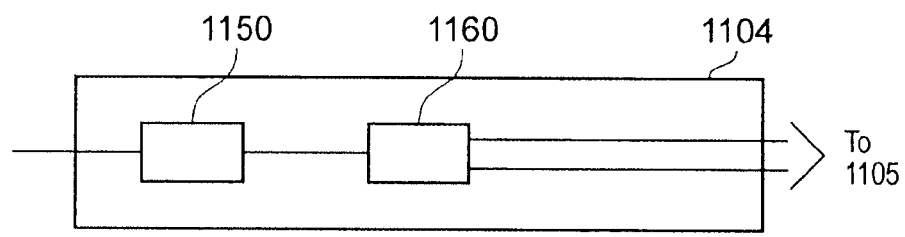
FIG. 11 shows a reformatting device located within the server according to the first embodiment of the present invention.

The reformatting device 1104 of server 110 will now be described with reference to FIG. 11. The background of the ultra-high definition image generated by the background generator is fed into a scaling device 1150. The background of the ultra-high definition image is 6k×1k pixels in size. The scaling device 1150 reduces this scale to 3840×720 pixels. As should be noted, the amount of scaling in the horizontal direction is less than in the vertical direction. In other words, the reduction of data in the horizontal direction is less than the reduction of data in the vertical direction. This is particularly useful when capturing an event like a soccer match because the ball travels in the horizontal direction and most of the movement of the players is in the horizontal direction. Therefore it is important to ensure that the resolution in the horizontal direction is high. However, the invention is not limited and if there were a situation in which the images captured an event where vertical movement was most important, then the amount of scaling in the vertical direction will be less than that in the horizontal direction.

The scaled image is fed into a frame splitter 1160. The frame splitter 1160 splits the scaled background image equally in the horizontal direction. The Frame splitter 1160 is configured to produce two frames of 1920×1080 pixels. This is to comply with the 1080 30P (1920) frame AVCHD format. The two frames are fed to the adder 1105.

As will be noted here, the frame splitter 1160 adds 360 blank pixels in the vertical direction. However, in order to utilise the bandwidth efficiently, this blank space will have the isolated player blocks which were extracted by the object key generator 1103 inserted therein. This means that the isolated player blocks can be transferred over the Internet 120 in an efficient manner. The isolated player blocks are inserted into the two images in the adder 1105. This means that the output from the adder 1105 which is fed into the AVC encoder 1106 comprises a composite image including the scaled and split background and the isolated player blocks inserted into the 360 blank pixels.

Figure 12:
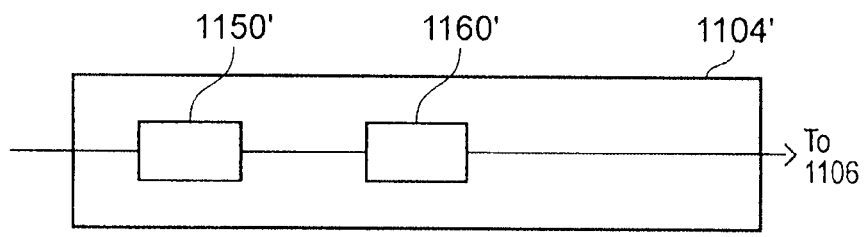
FIG. 12 shows a reformatting device located within the server according to the second embodiment of the present invention.

Referring to FIG. 12, the reformatting device 1104' of the alternative server 110' is described. In this case, the ultra-high definition image is fed into the scaler 1150' which is configured to scale the ultra-high definition image into an image of 2880×540 pixels. The scaled image is fed into a frame splitter 1160'. The frame splitter 1160' is configured to split the scaled image equally in the horizontal direction and form one image that is 1440×1080 pixels in size and thus conforms to the 1080 30P (1440) frame AVCHD format. In other words, the left side of the scaled image forms the top half of the generated image and the right side of the scaled image forms the bottom half of the generated image. This single image is fed to the AVC encoder 1106'.

AVC Encoding

The AVC encoding performed by the AVC encoder 1106 in server 110 will now be described. As noted earlier, the object key generator 1104 generates the player blocks and extracts the contents of the player blocks from the ultra-high definition image. The contents of the player blocks are provided in the blank 360 pixels in the scaled and split composite images. The macroblock associated with the position of the player blocks (i.e. the position of each player block in the blank pixels) is fed to the quantiser in the AVC encoder 1106. Specifically, the quantisation of the player block in the composite image is controlled such that the AVC encoder 1106 uses more bits to encode the player blocks than anywhere else in the image. This improves the quality of the player blocks as the user will concentrate viewing on the player blocks.

The two composite images which consist of a background and the player blocks are AVC encoded using H.264 encoding and transmitted with a bit rate of approximately 7 Mbps, although this can vary depending on the capability of the network.

In alternative server 110', the AVC encoding is performed by AVC encoder 1106. As noted above, the reformatted image fed into the AVC encoder 1106' is the ultra-high definition image in the 1080 30P (1440) format. Unlike the server 110, the object key generator 1103' in the alternative server 110' does not extract the contents of the player blocks. Instead, the position of each player block and the macroblock number associated with each player block is used to control the quantisation of the AVC encoder 1106'. The quantisation is controlled to ensure that the player blocks are encoded with more bits than any other part of the image to ensure that the players are clearly reproduced. The AVC encoder 1106' encodes the image using the H.264 standard at a bit rate of around 3 Mbps, although this may be altered depending upon the capacity of the network.

The encoded images produced by the encoder in either server are fed to a data stream producing device 1108. Additionally fed to the data stream producing device 1108 are the macroblock number associated with the respective player blocks and the position of each player block in the encoded image. This is transferred to the client device 200A or the user equipment as metadata.

Depth Map and Position Data Generation

Embodiments of the present invention in which a distance between a camera and an object within an image captured by the camera is used to determine the offset amount will now be described with reference to FIGS. 13 to 15. This is performed in the depth map generator 1107 located in both server 110 and alternative server 110'.

Figure 13:
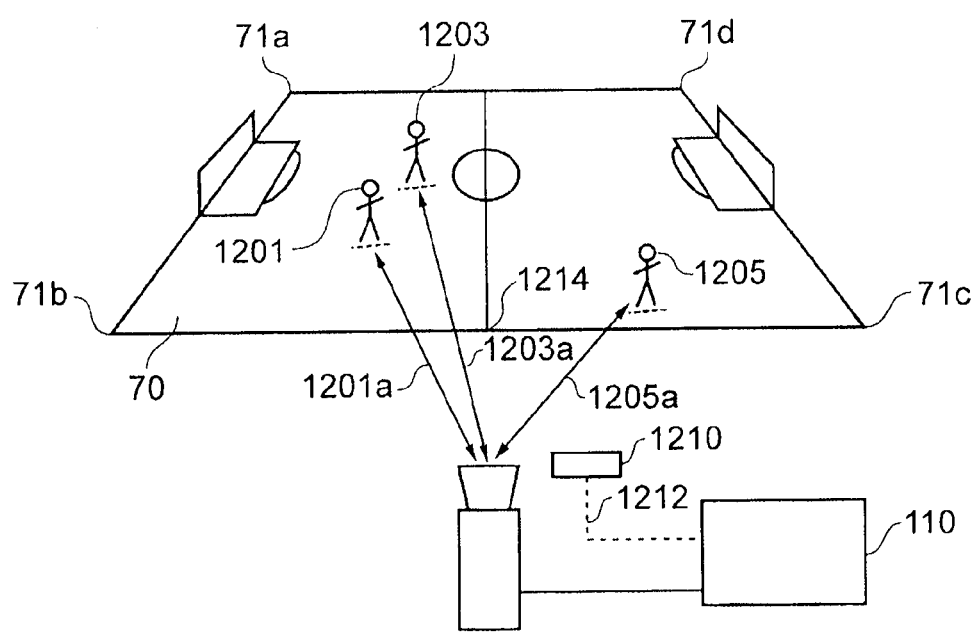
FIG. 13 is a schematic diagram of a system for determining the distance between a position of the camera and objects within a field of view of the camera in accordance with both the first and second embodiments of the present invention.

FIG. 13 is a schematic diagram of a system for determining the distance between a position of the camera and objects within a field of view of the camera in accordance with embodiments of the present invention.

FIG. 13 shows the server 110 arranged to communicate a camera in the camera arrangement 130, which captures images of the pitch 70. As described above, the server 110 is operable to analyse the images captured by the camera so as to track players on the pitch 70, and determine their position on the pitch 70. In some embodiments, the system comprises a distance detector 1210 operable to detect a distance between the camera and objects within the field of view of the camera. The distance detector 1210 and its operation will be described in more detail later below.

In some embodiments, the server 110 can use the tracking data and position data to determine a distance between a position of the camera and players on the pitch. For example, the server 110 can analyse the captured image so as to determine a distance 1201a between a position of the camera and a player 1201, a distance 1203a between the position of the camera and a player 1203, and a distance 1205a between the position of the camera and a player 1205.

In other words, embodiments of the invention determine the distance between the object within the scene and a reference position defined with respect to the camera. In the embodiments described with reference to FIG. 13, the reference position is located at the position of the camera.

Additionally, in some embodiments, the server 110 is operable to detect predetermined image features within the captured image which correspond to known feature points within the scene. For example, the server 110 can analyse the captured image using known techniques so as to detect image features which correspond to features of the football pitch such as corners, centre spot, penalty area and the like. Based on the detected positions of the detected known feature points (image features), the server 110 can then map the three dimensional model of the pitch 70 to the captured image using known techniques. Accordingly, the server 110 can then analyse the captured image to detect the distance between the camera and the player in dependence upon the detected position of the player with respect to the 3D model which has been mapped to the captured image.

In some embodiments of the invention, the server 110 can analyse the captured images so as to determine a position at which the player's feet are in contact with the pitch. In other words, the server 110 can determine an intersection point at which an object, such as a player, coincides with a planar surface such as the pitch 70.

Where an object is detected as coinciding with the planar surface at more than one intersection point (for example both of the player's feet are in contact with the pitch 70), then the server 110 is operable to detect which intersection point is closest to the camera and use that distance for generating the offset amount. Alternatively, an average distance of all detected intersection points for that object can be calculated and used when generating the offset amount. However, it will be appreciated that other suitable intersection points could be selected, such as an intersection point furthest from the camera.

However, in some situations, the method of determining the distance between the position of the camera and the object within the scene as described above may cause distortions in the appearance of the three-dimensional image. Such distortions may be particularly apparent if the image is captured by a very wide angle camera or formed by stitching together images captured by a number of high definition cameras such as the case in embodiments of the invention.

For example, image distortions in the three-dimensional image may occur if the pitch 70 is to be displayed as a three-dimensional image upon which the players and the ball are superimposed. In this case, corners 71*b* and 71*c* will appear further away than a centre point 1214 on the sideline closest to the camera 30. The sideline may thus appear curved, even though the sideline is straight in the captured image.

This effect can be particularly apparent when the three-dimensional image is viewed on a relatively small display such as a computer monitor. If the three-dimensional image is viewed on a comparatively large screen such as a cinema screen, this effect is less obvious because the corners 71*b* and 71*c* are more likely to be in the viewer's peripheral vision. The way in which the pitch may be displayed as a three-dimensional image will be described in more detail later below.

A possible way to address this problem would be to generate an appropriate offset amount for each part of the image so as to compensate for the distortion. However, this can be computationally intensive, as well as being dependent on several physical parameters such as degree of distortion due to wide angle image, display size and the like.

Therefore, to reduce distortion in the three-dimensional image and to try to ensure that the front of the pitch (i.e. the sideline closest to the camera) appears at a constant depth from the display, especially when the three-dimensional image is to be viewed on a relatively small display such as a computer monitor or television screen, embodiments of the invention determine the distance between the object and a reference position which lies on a reference line. The reference line is orthogonal to the optical axis of the camera and passes through a position of the camera, and the reference position is located on the reference line at a point where an object location line and the reference line intersect. The object location line is orthogonal to the reference line and passes through the object. This will be described below with reference to FIG. 14.

Figure 14:
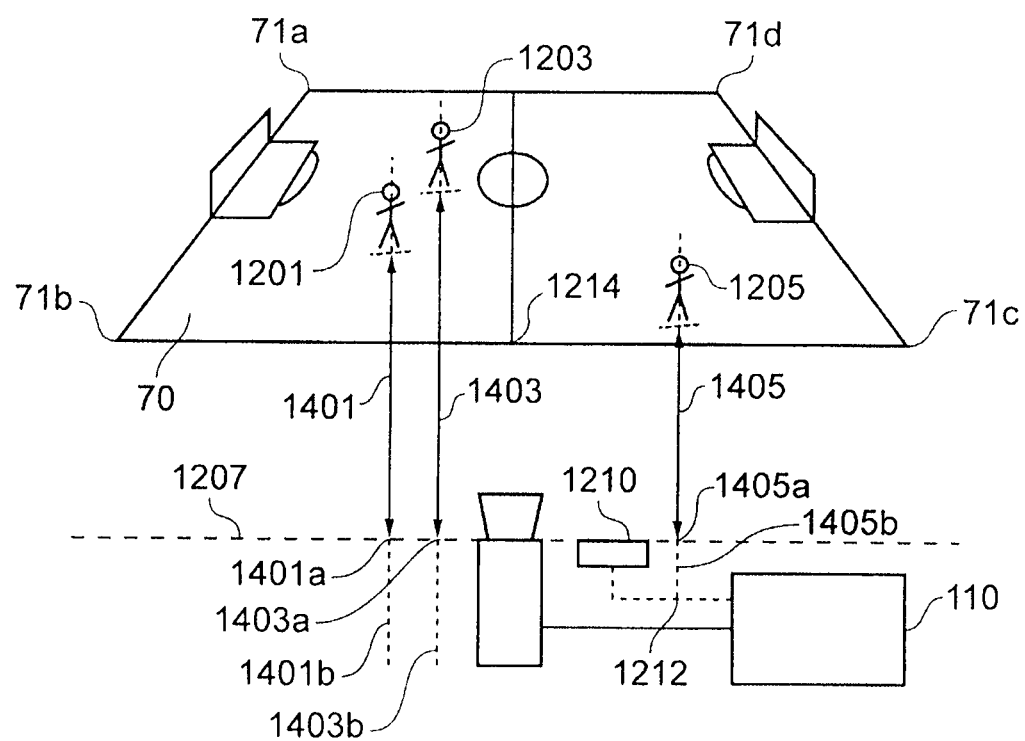
FIG. 14 is a schematic diagram of a system for determining the distance between a camera and objects within a field of view of the camera in accordance with the first and second embodiments of the present invention.

FIG. 14 is a schematic diagram of a system for determining the distance between a camera and objects within a field of view of the camera in accordance with embodiments of the present invention. The embodiment shown in FIG. 14 is substantially the same as that described above with reference to FIG. 9. However, in the embodiments shown in FIG. 14, the server 110 is operable to determine a distance between an object and a reference line indicated by the dashed line 1207.

As shown in FIG. 14, the reference line 1207 is orthogonal to the optical axis of the camera (i.e. at right angles to the optical axis) and passes through the position of the camera. Additionally, FIG. 14 shows reference positions 1401*a*, 1403*a*, and 1405*a* which lie on the reference line 1207.

For example, the workstation is operable to determine a distance 1401 between the reference position 1401*a* and the player 1201. The reference position 1401*a* is located on the reference line 1207 where an object reference line (indicated by dotted line 1401*b*) for player 801 intersects the reference line 1207. Similarly, the reference position 1403*a* is located on the reference line 1207 where an object reference line (indicated by dotted line 1403*b*) for player 1203 intersects the reference line 1207, and the reference position 1405*a* is located on the reference line 1207 where an object reference line (indicated by dotted line 1405*b*) intersects the reference line 1207. The object reference lines 1401*b*, 1403*b*, and 1405*b* are orthogonal to the reference line 1207 and pass through players 1201, 1203 and 1205 respectively.

In some embodiments, the reference line 1207 is parallel to the sideline which joins corners 71*b* and 71*c* so that, when a captured image of the pitch and a modified image of the pitch are viewed together on a display in a suitable manner, all points on the side line joining corners 71*b* and 71*c* appear as if at a constant distance (depth) from the display. This improves the appearance of the three-dimensional image without having to generate an offset amount which compensates for any distortion which may arise when the image is captured using a wide angle camera or from a composite image formed by combining images captured by two or more cameras as is the case in embodiments of the present invention. However, it will be appreciated that the reference line need not be parallel to the sideline, and could be parallel to any other appropriate feature within the scene, or arranged with respect to any other appropriate feature within the scene.

In order for images to be generated such that, when viewed, they appear to be three-dimensional, the server 110 is operable to detect a position of an object such as a player within the captured image. The way in which objects are detected within the image by the server 110 is described above with reference to FIG. 6. This information is fed to the user device 200A. The user device 200A then generates a modified image from the captured image by displacing the position of the object within the captured image by the offset amount so that, when the modified image and the captured image are viewed together as a pair of images on the display 205, the object appears to be positioned at a predetermined distance from the display. This will be explained below.

In order to produce the correct displacement to simulate a 3 dimensional effect, the user device 200A needs to know the distance of the object from the camera. This can be achieved using a depth map, or some other means. In some embodiments of the invention, the system comprises a distance detector 1210 which may communicate with the server 110 or with the user devices 200A over the network. The distance detector 1210 may be coupled to a camera within the camera arrangement 130 or it may be separate to the camera arrangement. The distance detector is operable to generate distance data indicative of the distance between the camera and an object such as a player on the pitch 70. The distance detector 1210 is operable to send the distance data to the server 110 via a suitable communication link, as indicated by dashed line 1212 in FIG. 13. The server 110 is then operable to determine the distance between the camera and the object in dependence upon the distance data received from the distance detector 1210. In other words, the distance detector 1210 acts as a distance sensor. Such sensors are known in the art and may use infrared light, ultrasound, laser light and the like to detect distance to objects. The distance data for each object is then fed to the user device 200A.

In some embodiments, the distance detector is operable to generate a depth map data which indicates, for each pixel of the captured image, a respective distance between the camera and a scene feature within the scene which coincides with that pixel. The distance data sent from the server 110 to the user device 200A can then comprise the distance map data.

To achieve this functionality, the distance detector may comprise an infrared light source which emits a pulse of infrared light. The camera can then detect the intensity of the infrared light reflected from objects within the field of view of the camera at predetermined time intervals (typically of the order of nano-seconds) so as to generate a grey scale image indicative of the distance of objects from the camera. In other words, the grey scale image can be thought of as a distance map which is generated from detecting the time of flight of the infrared light from the source to the camera.

To simplify design, the camera can comprise a distance detector in the form of an infrared light source. Such cameras are known in the art such as the "Z-Cam" manufactured by 3DV Systems. However, it will be appreciated that other known methods of generating 3D depth maps could be used, such as infrared pattern distortion detection.

It will be appreciated that any other suitable distance detector could be used. For example, a camera having an optical axis which is perpendicular to the optical axis of the camera may be used to capture images of the pitch. These further captured images may be analysed by the server 110 to detect and track the player positions and the resultant data correlated with the image data from the camera so as to triangulate the position of the players more accurately.

In some embodiments, the server 110 is operable to use the distance detector 1210 to detect and track other objects in the field of view of the camera, such as a soccer ball, although it will be appreciated that any other suitable object could be detected. For example, images captured by one or more additional cameras may be analysed by the server 110 and combined with data from the tracking system so as to track the soccer ball. This data is fed to the user device 200A as position and depth information so that the user device 200A may generate appropriate left-hand and right-hand images accordingly.

The server 110 is operable to detect object pixels within the captured image which correspond to the object within the scene. In the embodiments described above, the object pixels correspond to those pixels of a player mask used to generate the modified image as described below. The player mask is fed to the user device 200A so that the user device 200A may generate the modified image.

The user device 200A then determines the distance between the camera and the player using the distance data which is associated with the pixels of the player mask in the distance map data. To simplify three dimensional display, a mean average of distance values in the distance map data which correspond to the pixels of the player mask may be used to generate the offset amount as described above. However, it will be appreciated that any other suitable method of selecting a distance value from the distance map data corresponding to an object could be used.

The user device 200A is operable to generate an offset amount to apply between the left-hand image and the right-hand image for each pixel in the depth map data. Consequently, after the disparity is applied, when the left-hand image and the right-hand image are viewed together as a pair of images on the display as described above, the objects may have an improved three-dimensional appearance because surface dimensionality of objects may be more accurately reproduced rather than displaying the object as if it were a two dimensional image at some distance from the display.

User Device 200A and User Equipment 320A

Figure 15A:
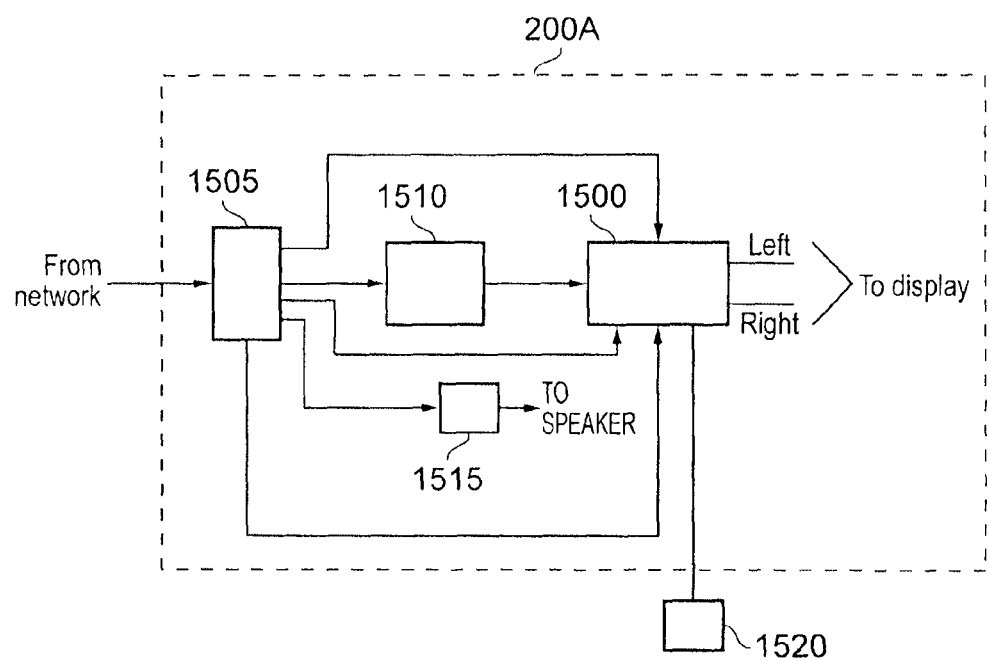
FIG. 15A shows the client device according to the first embodiment of the present invention.

An embodiment of the user device 200A will now be described with reference to FIG. 15A. The user device 200A includes a demultiplexor 1505 which receives the multiplexed data stream over the Internet. The demultiplexor 1505 is connected to an AVC decoder 1510, an audio decoder 1515 and a client processing device 1500. The demultiplexor 1505 demultiplexes the multiplexed data stream into an AVC stream (which is fed to the AVC decoder 1510), an audio stream (which is fed to the audio decoder 1515) and the depth map data, the player metadata, such as the name of the player, and any other metadata (which is fed to the client processing device 1500). The user can also interact with the user device 200A using a controller 1520 which sends data to the client processing device 1500. The client processing device 1500 will be described in detail with reference to FIG. 16A.

Figure 15B:
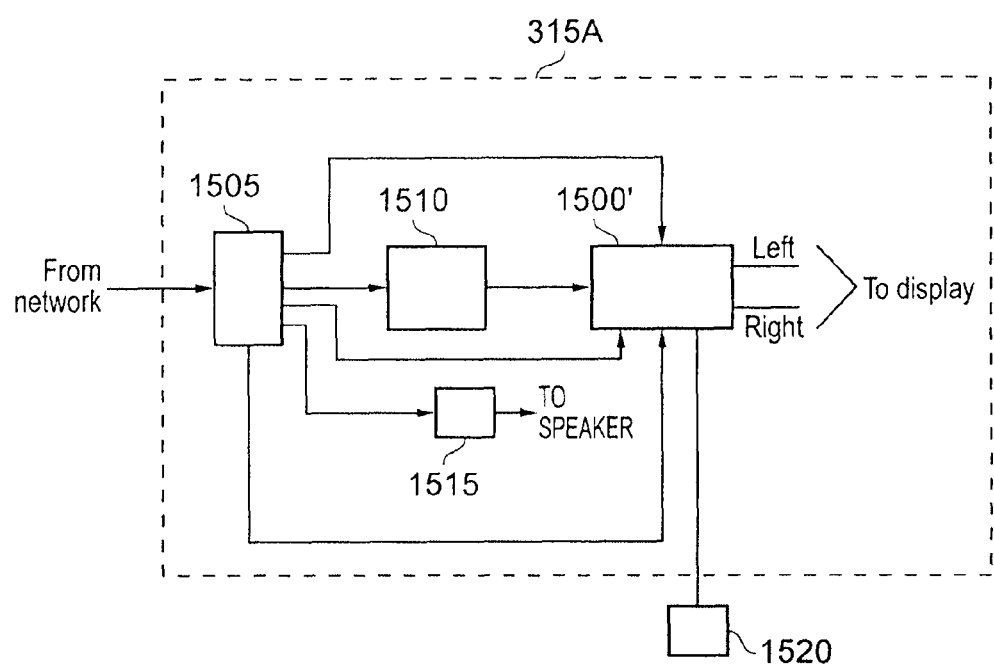
FIG. 15B shows the client device according to the second embodiment of the present invention.

An embodiment of the user equipment 315A will be described with reference to FIG. 15B. As will be apparent, many of the components in the user equipment 315A are the same or provide a similar function to those as described in relation to the user device 200A. These components have the same reference numbers and will not be described any further. As will be apparent from FIG. 15B, though, the user equipment processing device 1500' is provided instead of the client processing device 1500 in FIG. 15A. However, it should be noted that the user equipment processing device 1500' receives similar data to the client processing device 1500 and the function of the user equipment processing device 1500' will be described in FIG. 15B. The user control 1520 in FIG. 15B may be integrated into the user equipment 315A as a touchscreen or a keyboard or the like.

Client Processing Device 1500

The client processing device 1500 comprises an image processing unit 1600 which generates the left and right images to be displayed. The image processing unit 1600 receives the two composite background images from the server 110. The two composite background images from server 110 are also fed into a player block extraction device 1615. The player block extraction device 1615 extracts the player blocks from the composite images. The extracted player blocks are fed to the image processing unit 1600. Also fed into the image processing unit 1600 from the player block extraction device 1615 is the location of each player block on each of the background composite images and the macroblock number associated with the player block. This enables the image processing unit 1600 to place the player block at the correct location on the background composite images to recreate the two composite images of the ultra high definition image efficiently. The two composite images are stitched together by the image processing unit 1600 to form the ultra high definition image.

The player metadata which includes the name of each of the players in the player blocks is received in a data controller 1610. Also fed into the data controller 1610 is the information from the user controller 1520 and additional metadata which provides the parameters of the camera arrangement and the like which allows the user to select an appropriate field of view as described in GB 2444566A. The output of the data controller 1610 is a multiplexed data stream containing this information. The multiplexed output of the data controller 1610 is fed into a virtual camera generator 1605. Moreover, the virtual camera generator 1605 receives the depth map. As the virtual camera generator 1605 is fed information from the user control 1520, the virtual camera generator 1605 identifies the boundaries of the virtual camera. In other words, the user manipulates the user control 1520 to determine which area or segment of the ultra-high definition image is of importance to them. The virtual camera generator 1605 selects the segment of the ultra high definition of importance and displays this area. The method by which the area is generated and displayed is described in GB 2444566A.

The method in GB 2444566A relates to generating a single image. However, in embodiments of the present invention, the selected area may be displayed stereoscopically. In other words, the selected area should be displayed so that it may be viewed in 3D. In order to do this, a displaced selected segment, which has a background having each pixel displaced by an amount dependent upon the depth map and with horizontally displaced foreground objects, is generated. As the position on the screen of the user selected area is known, and the size of the screen on which the image is to be displayed is known, using the corresponding distance of the selected area from the camera (i.e. the depth map), the disparity between the foreground objects (i.e. the horizontal displacement between the foreground objects in the user defined segment and the second selected segment) is determined as would be appreciated by the skilled person. This disparity determines the apparent depth associated with the foreground object on the screen. The user selected segment is then displayed on the display to be viewed by the user's left eye and the displaced selected segment is displayed on the display to be viewed by the user's right eye. The user selected segment and the displaced selected segment are displayed stereoscopically. Moreover, the user can control the amount of displacement which allows the user to adjust the amount of displacement between the left and right eye images of the selected segments to adjust the apparent depth of the scene in the 3D image.

User Equipment Processing Device 1500'

Figure 16A:
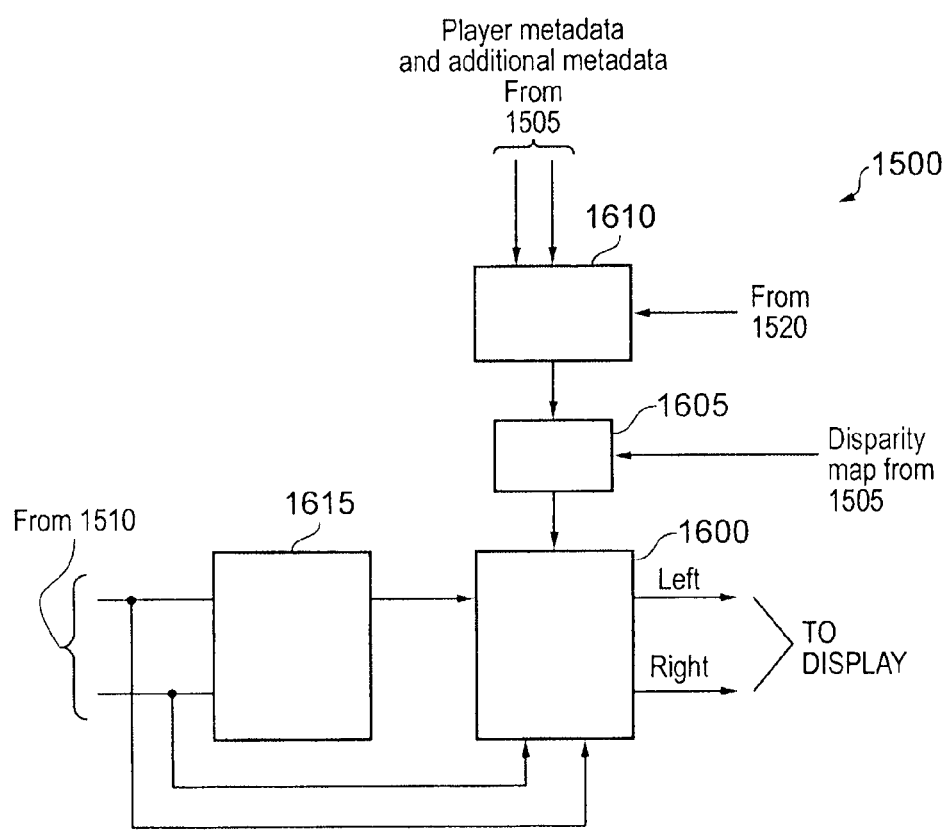
FIG. 16A shows a client processing device located in the client device of FIG. 15A.
Figure 16B:
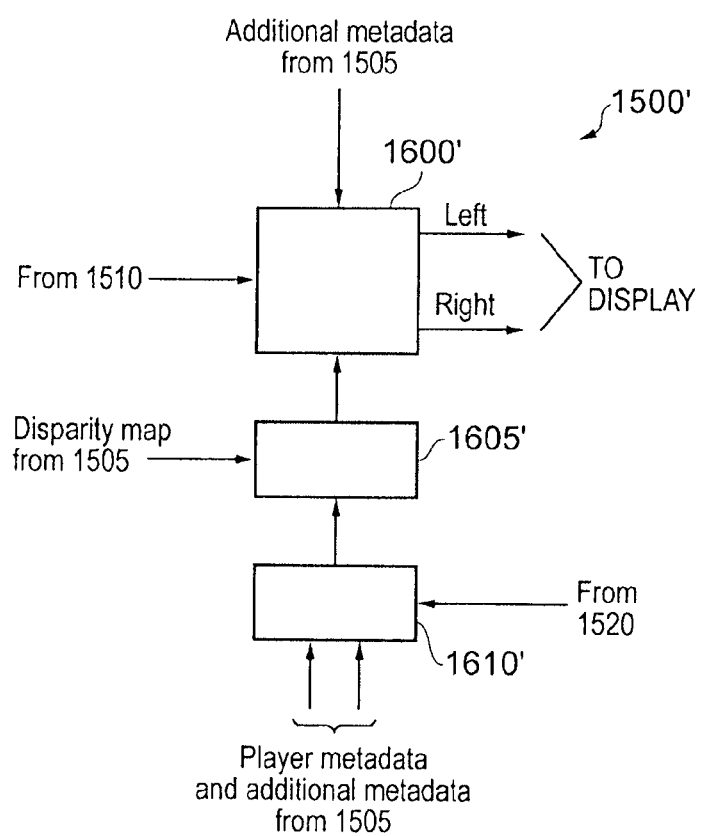
FIG. 16B shows a client processing device located in the client device of FIG. 15B.

The user equipment processing device 1500' will now be described with reference to FIG. 16B. The composite image sent over the LTE network is fed into a user equipment image processor 1600'. Additionally provided to the user equipment image processor 1600' is the additional metadata that provides the camera parameters and the like allowing the user to select an area of the ultra-high definition image for display. The metadata required is noted in GB 244566A and allows the user to select an area of the ultra high definition image for viewing. The method by which the area is selected and displayed is also described in GB 244566A.

The user equipment processing device 1500' also has input thereto player metadata which indicates where in the composite image a player is located. This player metadata is, in embodiments, a set of co-ordinates which defines in the composite image a box that surrounds the player. The additional player metadata may include names and statistics of each player, for example age, previous clubs, position in the team etc. The player metadata and additional player metadata is fed into a user equipment data controller 1610'. Also led into the user equipment data controller 1610' is user generated control information which is produced by the user control device 1520'. This allows the user to interact with the user equipment to alter the position of the selected area in the ultra high definition image as well as other interactive controls.

The output of the user equipment data controller 1610' is fed to a virtual camera processing device 1605' as a multiplexed data stream. Also fed into the virtual camera processing device 1605' is the depth map. The virtual camera processing device 1605' generates a left and right image segment selected by the user in the same manner as discussed in respect of the virtual camera generator 1605 above. This provides a stereoscopic image for 3D display. It should be noted that the virtual camera processing device 1605' is slightly different than the virtual camera generator 1605 in that the entire image is treated as background so each image pixel in the selected area is displaced by an amount dependent on the depth map, regardless of whether it constitutes part of the background or part of a foreground object. Each pixel is horizontally displaced by an amount provided by the calculated disparity (which is calculated from the depth map and the size of the display as would be appreciated by a skilled person). This allows for 3D viewing of the scene on the display.

It should be noted that in both the embodiments described with reference to FIGS. 16A and 16B, the information defining the zoom, pan, tilt and convergence of the virtual camera, as well as the details defining the position of the selected area on the screen, and any other user defined information, such as any changes to the horizontal displacement will be stored by the user device 200A or the user equipment 315A. Additionally stored is a unique identifier such as a UMID associated with the particular footage in which this view was experienced. This information will be stored as metadata which contains less data than the image data that is displayed and may be stored on either the user device 200A or the user equipment 315A or on the network server 1700. This stored metadata, when provided in conjunction with the composite images, the player keys (if necessary) and the player information, would enable either the user to re-create the same experience on either the user device 200A or the user equipment 315A. Moreover, if provided to a different user, this stored metadata would enable the different user to recreate the experience of the first user. An embodiment explaining the use of the stored metadata will be explained with reference to FIGS. 17 to 19B.

Community Viewing

Figure 17:
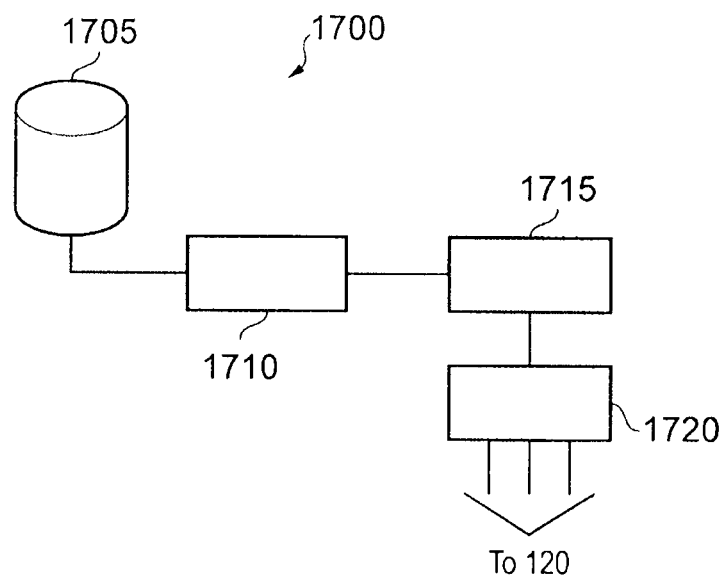
FIG. 17 shows a networked system according to another embodiment of the present invention.
Figure 18:
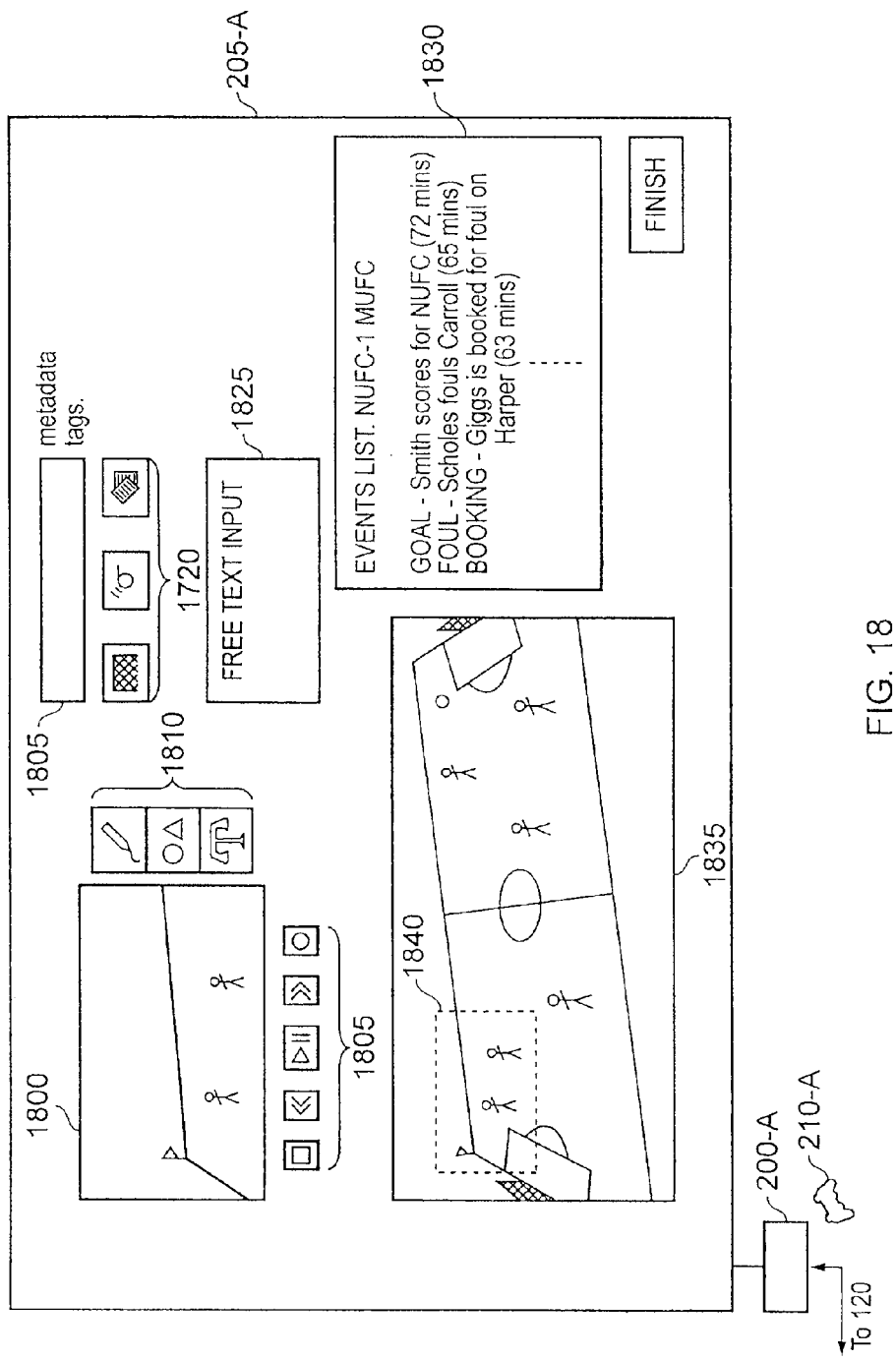
FIG. 18 shows a client device according to either the first or second embodiment located in the networked system of FIG. 17 used for generating a highlight package.

The network server 1700 is connected to the Internet and is shown in FIG. 17. The network server 1700 can connect equally to both the user equipment 315A and user device 200A. In fact, in embodiments, one user can connect both his or her user equipment 315A and his or her user device 200A to the network server 1700 using a user account. However, for brevity, connection and use of the user device 200A is now described.

Referring to FIG. 17, the network server 1700 contains a storage medium 1705 which may be an optical or magnetic recording medium. The storage medium 1705 is connected to a database manager 1710 that stores information on the storage medium 1705. The database manager 1710 is also used to retrieve data stored on the storage medium 1705. The database manager 1710 is connected to a network processor 1715 which controls access to the database manager 1710. The network processor 1715 is connected to a network interface 1720 that allows data to be transferred over the Internet 120.

When the user device 200A connects to the Internet 120, the user device 200A may connect to the network server 1700. When the user device 200A first connects to the network server 1700 the user is asked to either log in to his or her account on the network server 1700 or to create a new account. If the user chooses to log in to the account, the user is asked to enter a username and password. This authenticates the user to the network server 1700. After correct authentication (which is carried out by the network processor 1715), the user may access his or her account details which are stored on the storage medium 1705. The account details may provide information relating to the user's favourite soccer team or the user's favourite player. By providing this information, the user may be provided with the most relevant footage in the highlights package as will be explained later.

Typically, the user may possess both user device and user equipment. If this is the case, the network server 1700 will store the details of the equipment owned by the user. The network server 1700 will also establish, by interrogation of the user device, whether a user device or the user equipment is connected to the network server 1700. The user can add or delete devices from his or her account once be or she is logged in.

One of the options associated with the user account is to upload the metadata stored on the user device 200A which would allow the user or a different user to recreate the user's viewing experience. This metadata may be collected by the user device 200A whilst viewing the match or if the user is logged into the network server 1700 prior to viewing the match, the metadata may be stored within the network server 1700. If the metadata is collected on the user device 200A, the user can upload the metadata to the network server 1700 when the user connects to the network server 1700. This can be done automatically or under user instruction.

In addition to the metadata enabling the viewer's experience to be replicated, further metadata may be transferred to the network server 1700. The generation and form of the further metadata will be explained with reference to FIG. 18 that shows a graphical user interface which the user uses to generate the metadata and the further metadata. The graphical user interface shown in FIG. 18 allows the user to generate annotations to a match. These annotations enhance the viewer's experience of the match. Moreover, as only metadata that recreates the match is stored, rather than the video clips themselves, the amount of data stored to recreate the match is reduced.

The graphical user interface is shown on display 205A of the user device 200A. The user interacts with the interface using controller 210A. The display contains a stitched image display area 1835 which displays the stitched ultra high resolution image. Within the ultra high definition image is a virtual field of view which enables the user to select a field of view of the stitched image. This is displayed in virtual field of view area 1800. In order for the user to identify which part of the ultra high definition image forms the virtual field of view, an outline of the virtual field of view 1840 is shown on the ultra high definition image.

Below the virtual field of view area 1800 are standard video control buttons 1805, such as pause, fast forward, rewind, stop and record. This array of video control buttons is not limited and may include any type of buttons that controls the action of video on the display. To the right of the virtual field of view area 1800 are editing buttons 1810. These editing buttons 1810 allow additional annotations to the video such as adding text, drawing lines or adding shapes to the video. When added to video, these additional annotations form part of the further metadata.

There is a metadata tag input area 1815 that allows metadata tags to be added to a particular frame, or frames of video. This may include a textual description of the content of the frames, for example penalty, tackle, free-kick, etc. Moreover, in order to enable easier annotation, common tags such as yellow card, goal and incident are provided as hotkeys 1720. Furthermore, a free text input area 1825 is provided. This allows any text to be added which the user wishes. This text, along with the metadata tag input also from part of the further metadata.

Finally, an events list area 1830 is provided. The events list area 1830 may be updated automatically by the metadata tags, or may be created by the user. Alternatively, the events list may be generated automatically using the metadata tags, and may be corrected or verified by the user. It is possible for the events list to be generated automatically because the user updates the goals, and bookings etc as the match progresses. Indeed, as the player position information is provided in the metadata, if the user identifies in the image which player scored the goal, the user device 200A knows which player scored the goal. Moreover, if the position of the ball is automatically tracked, then it is possible for the user device 200A to automatically define the scorer as being the last player to touch the ball before the "goal" metadata is produced. By automatically updating the events list using the metadata tags, it is easier to generate the events list. Moreover, by using the metadata and further metadata, there is a reduced amount of data stored either within the user device 200A and the network server 1700 as the events list is generated "on the fly" and so therefore does not need to be stored.

As well as uploading metadata onto the network server 1700, the user may also access and view highlight programmes generated by other users of the network server 1700. In other words, as well as accessing the highlight package generated by them, the user may also access highlight packages generated by a different user.

In order to do this, the user device 200A needs the original match footage and the metadata and further metadata which were uploaded by a different user. The original match footage may be provided either from the network server 1700 or using a peer-to-peer system which would increase the speed at which the match footage is provided. The metadata and further metadata will be provided by the network server 1700.

The method of finding and viewing the other user's viewing experience is explained with reference to FIGS. 19A and 19B.

Figure 19A:
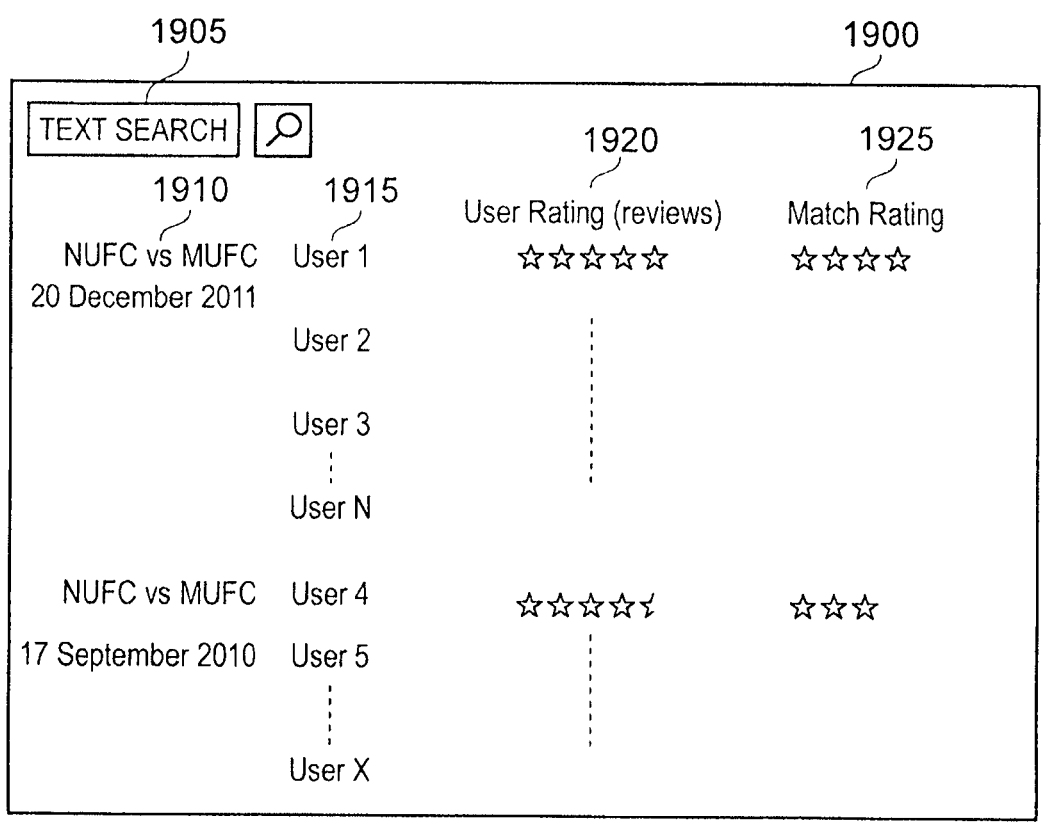
FIGS. 19A and 19B show a client device according to either the first or the second embodiment located in the networked system of FIG. 17 used for viewing a highlight package.

Referring to FIG. 19A, the display 1900 has a text search box 1905. This allows the free text metadata and the metadata tags stored on the network server 1700 to be searched. In the example shown in FIG. 19A, a search has been performed for highlight footage between "NUFC and MUFC". As will be appreciated from FIG. 19A, the match data 1910 is returned in chronological order. In other words, the most recent match is located towards the top of the list, with the older matches being located towards the bottom of the screen.

As well as the results of the search, the network server 1700 may use the information provided in the user's account such as favourite football team or favourite player to return the most relevant results without the user having to perform a search. For example, if the user is a fan of Newcastle United Football Club, the latest Newcastle United Soccer matches will be placed on the home screen. Similarly, if the user indicated that they were a fan of Cese Fabregas, then the latest clips that include the metadata tag "Cese Fabregas" will be placed on the home screen.

Adjacent the match data 1910 is user data 1915. This shows the username of each user who has uploaded a highlight package for the match. Adjacent the user data 1915 is user rating data 1920. This gives an average score attributed by other users who view other match highlight packages created by the user identified by the user data 1915. Reviews of the user are also accessible should a user click on the "review" hyperlink. In order to assist the user select which of the other users' highlight package to select, the most popular users are at the top of the list and the least popular are located at the bottom of the list.

Adjacent the user rating data 1920 is the match rating data rating 1925. This provides user feedback on the particular highlight package for this match. This type of information is useful because a user who normally performs excellent highlight packages may have produced a particularly poor highlight package for this match. Alternatively, a user who normally produces a mediocre highlight package may have performed a particularly good highlight package for this match.

In order to provide user flexibility, the ordering of each column of data may be varied depending on user preferences.

After the user has selected a particular highlight package, the original match is downloaded and stored locally within the user device 200A. Additionally downloaded (from the network server 1700) is the metadata for displaying the field of view experienced by the other user who produced the highlight package and any further metadata generated by the other user. As metadata is smaller than the data it is representing, the download speed and storage requirements associated with the metadata compared with downloading the highlight clips is small.

Figure 19B:
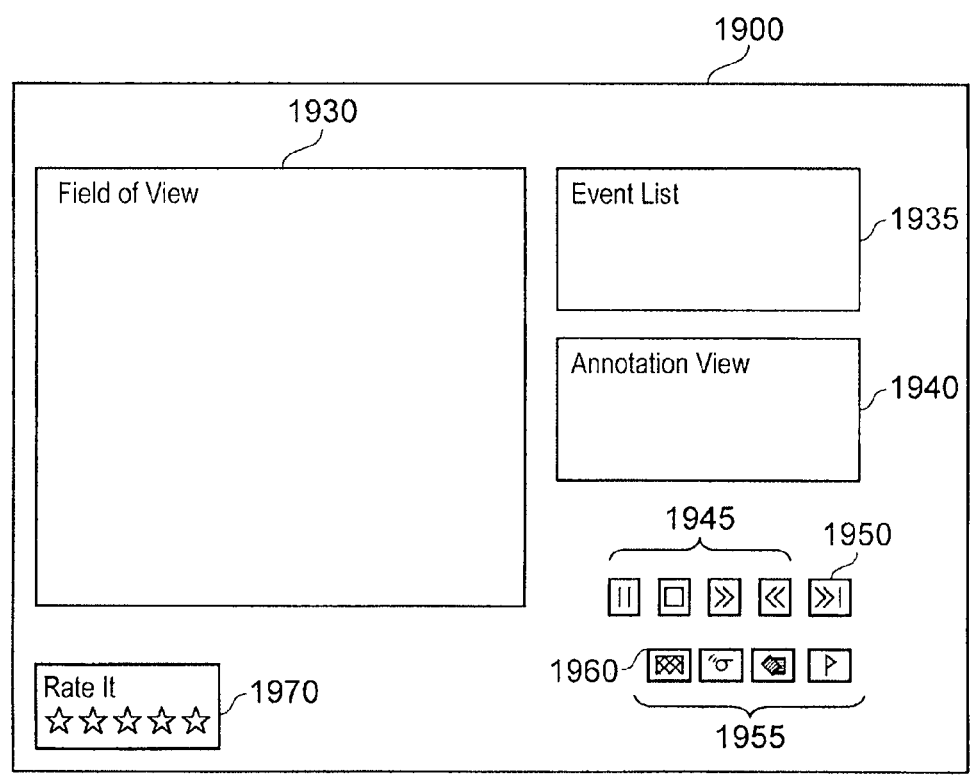

Referring to FIG. 19B, the screen 1900 has a field of view area 1930 that shows the field of view that was experienced by the other user who created the highlight package. This is created from the metadata and the original footage. An event list area 1935 is also on the display 1900. This list corresponds to the event list 1830 in FIG. 18. The annotation view area 1940 is created from the further metadata. This displays the last frame with annotations added by the other user to be displayed to the user. For example, if the other user highlighted a particular incident with mark-up, this will be placed in the annotation view area 1940. A standard set of video control buttons 1945 is provided such as speed up, or slow down of the video displayed in the field of view 1930. The next event button 1950 located adjacent the video control buttons 1945 allows a user to skip to the next event. The next event is a piece of footage of particular interest to the user. The user can select the next event of particular interest from the next event selection buttons 1955. In this embodiment, the next events include the next goal, the next free-kick, the next yellow or red card or the next corner. The user can easily see which event is selected by the box surrounding the appropriate next event symbol. In the embodiment, the next event highlight box 1960 surrounds the next goal.

The user is also able to refine another user's particular highlight package to improve the virtual camera positioning, edit the duration of the highlight package or add further annotation for example. This may be permitted by the user when creating the highlight package that may be edited. Further, additional annotations about a particular highlight package may be added by other users. This enables different users to comment on the particular highlight package. For example, a user can add a comment identifying a particular feature of the content which was perhaps missed by the creator of the highlight package. So in the context of a soccer game, a different user may identify the positioning of a player on the pitch which may not have been noticed by other users. This may lead to real time messaging between a group of users, each watching the same highlight package.

It may be that the annotations applied by the author of the highlight package are entered on video shown on a display having 1920×1080 pixel resolution. However, the other users may view the annotated video on a portable handheld device having a much smaller display. For example the handheld device may be a device with a display having 320×240 pixel resolution. Moreover, the other user on the portable device may apply further annotations to the highlight package created on the larger display. In embodiments, in order to address this, metadata may be stored along with the highlight package that indicates the size of the display on which the annotations were created. Accordingly, the pixel positions of the annotations on the display can be scaled or adjusted to ensure that when the annotations are reproduced on a different sized display, the annotations are placed on the correct areas of the display.

As an example, if the highlight package is generated on a display having a resolution of 1920×1080 pixels and an annotation having a size of 240×90 pixels is entered onto a frame on the highlight package having the top left pixel position of (430,210), metadata is generated defining the annotation, the size and pixel position of the annotation and the size of the display on which the annotation is generated. This is stored with the package.

When another user wishes to watch the highlight package on the portable device, the metadata describing the annotation is retrieved. The portable device knows the size and pixel position of the annotation and the size of the display on which the annotation was created. Therefore, the portable device scales the annotation so that the size of the annotation is correct for the display. Specifically, the size of the annotation on the portable device is 40×20 pixels. The position of the annotation when scaled for the portable device display will be pixel (71.6,46.6). In order to select a correct pixel position, the annotation will be placed at pixel position (72,47). This is a simple rounding up to the nearest pixel. However, other methods of pixels selection when the scaling results in a decimal pixel position is envisaged.

If the user of the portable device creates a further annotation having a size 38×28 pixels at pixel position (140, 103), metadata is created which describes the annotation and size of the display on which this annotation is created.

Therefore, if the original author views the package again, the annotation created by the user of the portable device will be scaled up to an annotation having a size 228×126 at a pixel position (840,463.5). Again, in order to correctly display the annotation on the display of the original author, the annotation will be placed at pixel position (840,464).

Finally, it is possible for the user to rate the quality of the particular highlight package using the box 1970. The user selects an appropriate mark (in this case out of 5), and clicks on the box 1970. This value is then transferred to the network server 1700 where it is stored in association with both the other user and with this particular highlight package.

By sending the metadata and further metadata to the network server 1700 instead of video clips, the amount of data sent over the network is reduced. Indeed, the amount of data handled by the network server 1700 can be further reduced when the original video footage is provided to the user via a different method. For example, the user may receive the original video footage using a peer-to-peer system or on a recording medium through the mail or the like.

It may be that the user creating the highlight package, or the user viewing the highlights package may pay a fee for this. The fee may be on a pay-per-view basis or as a monthly or annual subscription service.

Although the foregoing has been described with reference to the user device 200A, the user equipment 315A may equally be used.

Augmented Reality on the Client Device

Figure 20:
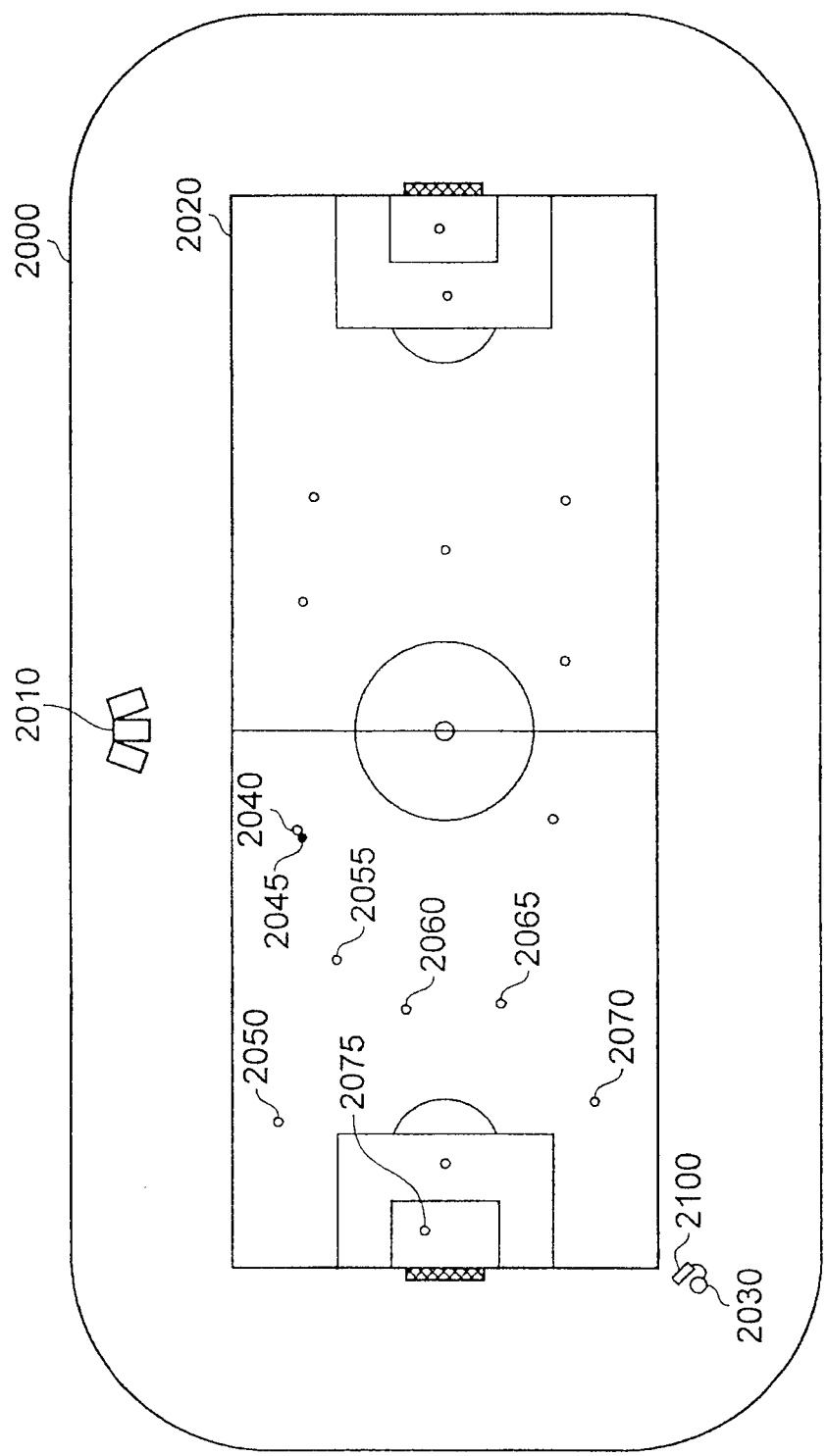
FIG. 20 shows a plan view of a stadium in which augmented reality may be implemented on a portable device according to another embodiment of the present invention.

FIG. 20 shows a plan view of a stadium 2000 in which a soccer match is taking place. The soccer pitch 2020 is located within the stadium 2000 and the match is being filmed by camera system 2010. Camera system 2010 includes the camera arrangement 130, image processing device 135 and server 110. The camera system includes a Global Positioning System (GPS) sensor (not shown), an altitude sensor and a tilt sensor. The GPS system provides a co-ordinate position of the camera system 2010, the altitude sensor provides identifies the altitude of the camera system and the tilt sensor provides an indication of the amount of tilt applied to the camera system 2010. The GPS system, altitude and tilt sensors are known and so will not be described hereinafter.

On the pitch are a first player 2040, second player 2050, third player 2055, fourth player 2060, fifth player 2065, sixth player 2070 and an seventh player 2075. A hall 2045 is also provided which is controlled by player 2040. The camera system 2010 is capturing the soccer match as described in the previous embodiments.

Figure 21:
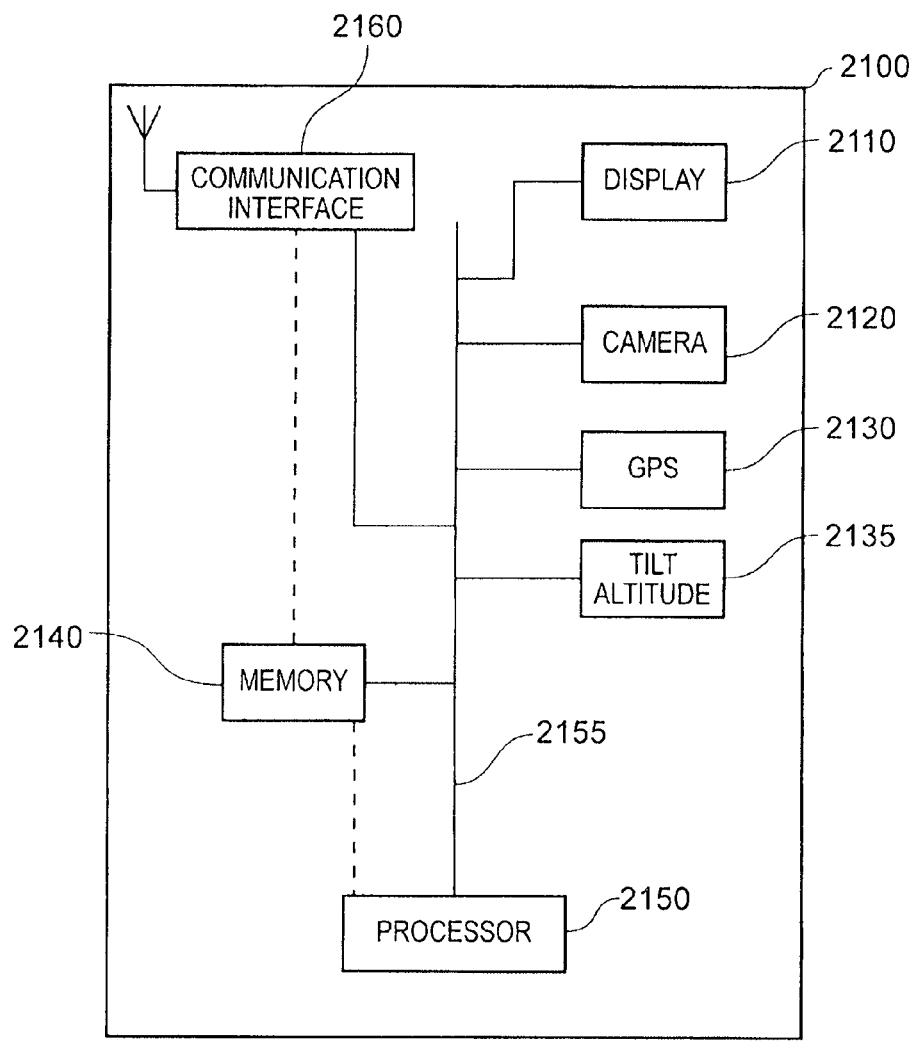
FIG. 21 shows a block diagram of a portable device according to FIG. 20.

Located within the crowd is a spectator 2030 who is viewing the match through his cellular phone 2100, which in embodiments is an Xperia X10 phone made by Sony Ericsson Mobile Communications. The cellular phone 2100 will be described with reference to FIG. 21. The cellular phone 2100 includes a communication interface 2160 which may communicate over a cellular network using 3G or LTE network standards. Indeed, the communication interface 2160 may be able to communicate using any network standard such as WiFi or Bluetooth or the like. Memory 2140 is also provided. On the memory, data is stored. The memory may be a solid state memory for example. The memory also stores computer readable instructions and so the memory 2140 is a storage medium which stores a computer program. In addition, the memory 2140 stores other types of data such as metadata, or user specific data, and data relating to the lens distortion of a camera 2120 in the cellular phone 2100. The cellular phone 2100 is provided with a display 2110 which displays information to a user.

The camera 2120 is arranged to capture images which may be stored in memory 2140 or may be displayed directly onto the display 2110 with or without being stored in the memory 2140. A GPS sensor 2130 which provides a globally unique position for the cellular phone 2100 is also provided. Moreover, a tilt and altitude sensor 2155 is also provided that provides an indication of the tilt applied to the cellular phone 2100 and altitude of the phone 2100. Additionally, the focal length of the camera 2120 used to view the scene is determined by the phone 2100.

Also provided is a processor 2150 which controls each of the aforesaid components and is arranged to run computer software thereon. An example of the processor 2150 in this embodiment is a SnapDragon Processor made by Qualcomm®. The processor 2150 is connected to each of the components using a data bus 2155.

Figure 22:
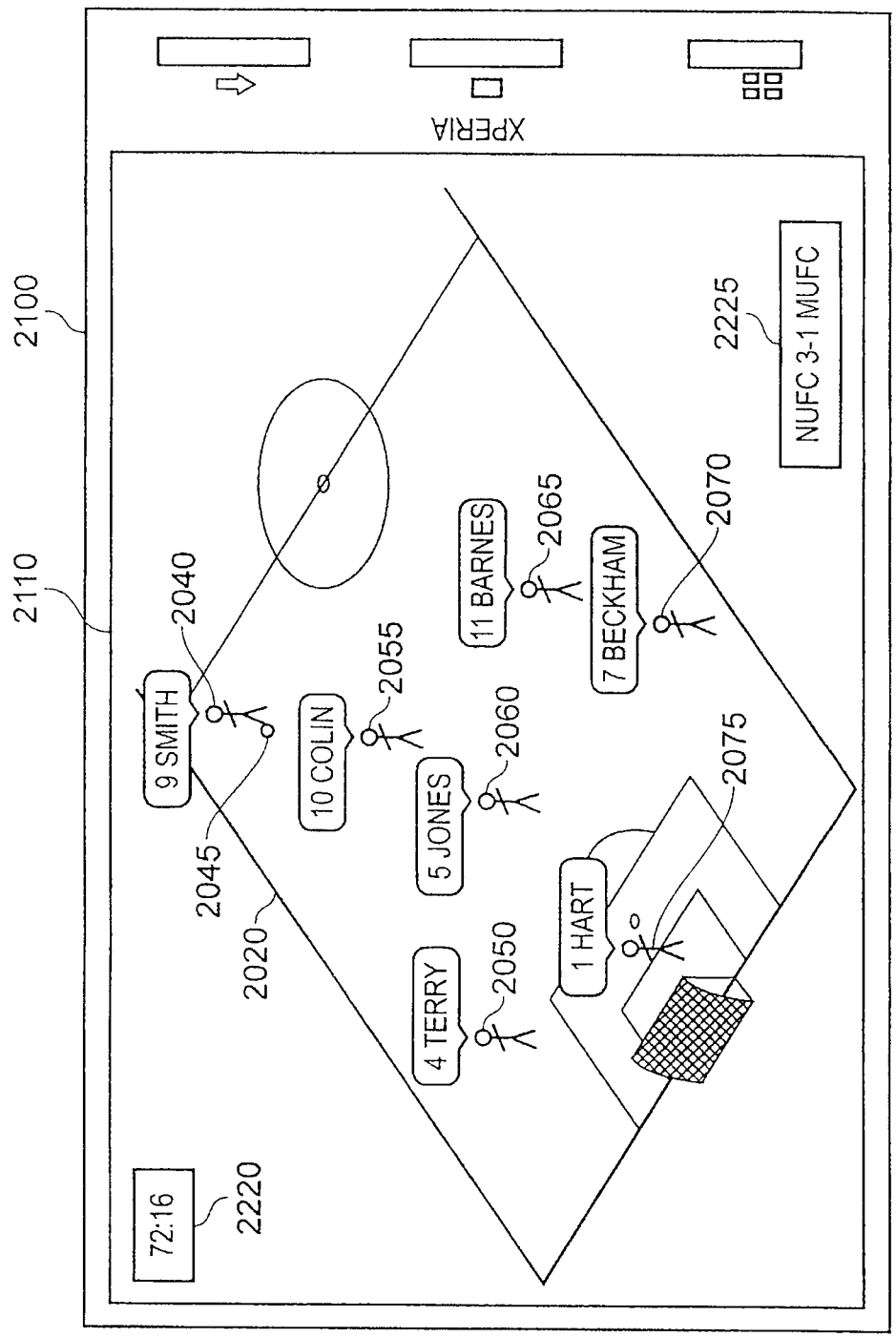
FIG. 22 shows the display of the portable device of FIGS. 20 and 21 when augmented reality is activated.

FIG. 22 shows the cellular phone 2100 as seen by the user 2030. The user 2030 is holding the cellular phone 2100 so that be may easily see the display 2110. The user is pointing the camera 2120 of the cellular phone 2100 at the match. The display 2110 shows a live image of the match captured by the camera 2120 on the cellular phone 2100. This is shown in FIG. 22 where each of the first thru seventh player is shown on the pitch 2020. Additionally, located above each of the players 2040 to 2075 is the name of each player. The name of each player is placed on the display 2110 by the processor 2150. The name of each player is provided from the player metadata generated in the camera system 2010. This will be explained later with reference to FIG. 23. In addition to the names above each player, a clock 2220 showing the match time is provided on the display 2110 and the current match score 2225 is also displayed.

In embodiments, the display 2110 is a touch screen which allows the user 2030 to issue commands to the cellular phone 2100 by pressing the display 2110. In order to provide an enhanced user capability, the name located above each player can be touched by the user 2030 to reveal a player biography. The player biographies may be stored in the memory 2140 before the match. Alternatively or additionally, by pressing the name above the player may provide real-time match statistics related to the player. In other words, the real-time match statistics provides details of the number of goals scored by the player, the number of passes completed by the player and, as the camera system 2010 uses player tracking, the amount of distance run by the player. This information may be provided to the phone 2100 in response to the user touching the name. Alternatively, this data may be continuously updated over the network and stored in the memory 2140 so that when the user touches the name, the information is retrieved from the memory 2140. This is quicker than requesting the information over the network. This information is generated by the camera system as explained with reference to FIG. 9 above.

Figure 23:
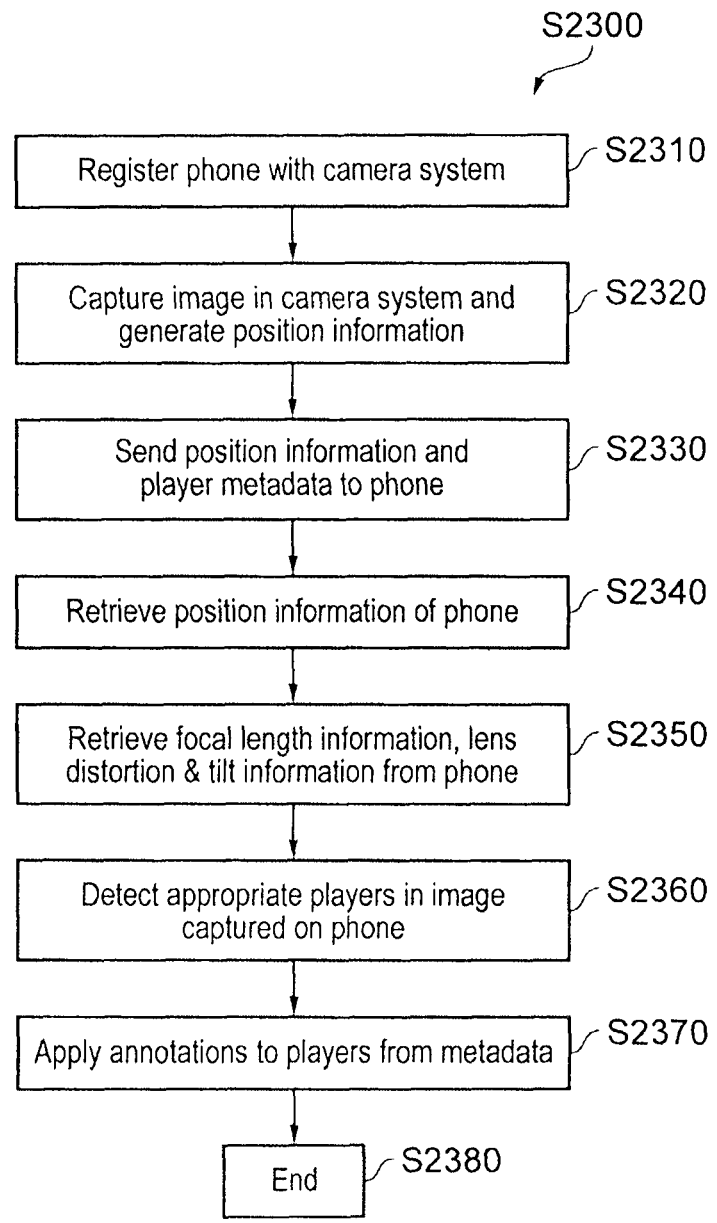
FIG. 23 shows a flow diagram explaining the augmented reality embodiment of the present invention.

Referring to FIG. 23 a method of placing the name of the player on the display 2110 is described. Cellular phone 2100 registers with the camera system 2010. During the registration process, an authentication process is completed which identities whether the user of the cellular phone 2100 is eligible to access the information. For example, payment information is exchanged. This is shown in step S2310.

As described above, the camera system 2010 captures the image of the match and from this captured image, the position of each player in the image is detected and the real-world position of the player determined. In order to achieve this, the camera system 2010 identifies where the detected object is on the pitch using the technique described in FIG. 14. It is important to note that the position of the player on the pitch using this technique determines the position of the player relative to the camera system 2010. Therefore, as the camera system 2010 is provided with its GPS position, the camera system 2010 determines the GPS position (or real-world position) of each player. Additionally, as the identity of each player is known, metadata associated with the player, such as the player name is also generated. This is step S2320.

The real-world position information and metadata is sent to the cellular phone 2100. This is step S2330. It should be noted that a detected image such as the soccer ball, or the referee or a referee assistant may also be transferred to the cellular phone 2100.

The cellular phone 2100 receives the real-world position information associated with each detected player, and the detected ball. The cellular phone 2100 retrieves a GPS value from the GPS sensor identifying the position of the cellular phone 2100. This is step S2340.

Moreover, the altitude and tilt values are retrieved from the altitude and tilt sensor located within the cellular phone 2100.

Additionally, the focal length of the camera 2120 in the phone 2100 is determined. This is step S2350

Using the GPS position of the phone 2100, the tilt angle and the focal length, the phone 2100 determines the area of pitch which is captured using the camera 2120. In other words, the phone 2100 determines the boundaries of the real-world position seen by the camera. This is further facilitated by the camera system 2010 providing the real-world position of reference points on the pitch. In order to achieve this, these reference points are used to calculate the real-world position and angle of the plane of the pitch. Using the GPS position of the phone and its tilt angle, a three dimension vector is computed that represents the direction in which the phone's lens is pointing in the real world. Using known techniques, the real-world point at which this vector bisects the plane of the pitch can thus be computed. This real-world point is the centre of the camera's field of view. To determine the extent of the field of view, the angle of the horizontal and vertical fields of view must first be computed. These are calculated from the sensor size and the focal length of the lens using known techniques.

As an example a formula such as the following is used:

FOV (horizontal)=2*arctan(SensorWidth/(FocalLength*2))

FOV (vertical)=2*arctan(SensorHeight/(FocalLength*2))

These angles are then used to rotate the vector that represents the direction in which the phone's lens is pointing, so that it passes through one of the corners of the camera's image. Again, using known techniques, the real-world point at which this vector bisects the plane of the pitch is computed. This real-world point is the corner of the camera's field of view. This technique is then repeated for all lour corners of the camera's field of view to determine the boundaries of the real-world position seen by the camera. As the cellular phone 2100 is provided with the real-world position of the players on the pitch, and the real-world key points on the pitch, the phone 2100 determines where in the image viewed by the camera 2120 the players and key-points are most likely to be seen. It then positions the annotations at these locations within the image.

In an alternative embodiment, for increased accuracy of annotation placement, the cellular phone 2100 then performs image detection on the captured image to detect any objects within the image. This is step S2360. As the cellular phone 2100 knows the boundary of the real-world position seen by the camera, the phone 2100 identifies the real-world position of each of the objects detected within the image. Accordingly, by comparing the real-world position of each of the objects captured by the phone 2100 with the real-world position of each of the objects captured by the camera system 2010, it is possible to determine which object within the image captured by the cellular phone 2100 corresponds to which detected player. The annotations provided by the camera system 2010 (which is supplied as metadata) are applied to the correct object within the image. This is step S2370. It should be noted here that to improve the accuracy of the annotating process, lens distortion of the camera in the cellular phone 2100 is taken into account. For example, if the lens distortion within the camera makes the light through the lens bend by 5 pixels to the left, the real-world position of the detected object will be different to that captured by the camera. Therefore, a correction may be applied to the detected position within the captured image to correct for such an error. The lens distortion is stored in the memory 2140 and is generated when the phone is manufactured. The process then ends (step S2380).

Using this information, in combination with the current local length of the cellular phone's camera, the cellular phone can determine which part of the stadium will appear in its Field of view and thus calculate where on its screen any of the players detected by the camera system should appear.

In embodiments, the object detection in the image captured by the cellular phone 2100 may be performed using a block matching technique or the like. This may improve the accuracy with which the annotations are placed on the display of the cellular phone 2100.

The camera system may send to the cellular phone 2100 representations of the objects (for example a cut-out of each player). The objects detected by the cellular phone 2100 may be compared with those received from the camera system 2010. This improves the quality of the detection technique.

In order to reduce processor power required to perform such an object comparison, the cellular phone 2100 in embodiments compares a known reference position from the camera system with a corresponding reference position within its field of view. For example, any pitch markings received from the camera system 2010 may be compared with any detected pitch markings in the image captured by the cellular phone 2100. It is useful to compare pitch markings as they are static in the scene and so the position of the markings will remain constant. If there is no match, or the probability of a match is below a threshold of, say, 98%, the detected ball received from the camera system 2010 is compared with other objects detected by the cellular phone 2100. As the user is likely to be focussing on the ball, it is most likely that any image captured by the cellular phone 2100 will include the ball. Moreover, as the ball is a unique object in the image, it will be much easier to detect this object and therefore processing power within the cellular phone 2100 is reduced.

If there is no match of the ball or the probability of the match is below a threshold, the objects detected by the cellular phone 2100 are compared against other objects sent from the camera system 2010. When a positive match is achieved, the position of the object detected by the cellular phone 2100 is compared with the position calculated by the transformation. This establishes a correction value. The correction value is then applied to each of the transformed position values. This corrected transformed position value identifies the position of the player to whom metadata, such as the player's name, is provided. The cellular phone 2100 applies the name to the detected object nearest to the corrected transformed position value. Specifically, the cellular phone 2100 inserts the name above the detected object. This improves the accuracy of the placement of the annotation. In order to provide an enhanced user experience, the match time and match score are applied to specific areas of the display, for example in the corners of the display. These areas are not normally the focus of the user so will not obscure the action.

It is envisaged that the augmented reality embodiment will be a computer program which runs on the cellular phone 2100. For example, the embodiment may be a so-called "application". In order to assist the user, when initialising the application, the cellular phone 2100 will automatically activate the GPS sensor and the altitude and tilt sensors. Moreover, as it is expected that during the match, the user may wish not to interact with the cellular phone 2100. Normally, in order to save battery power, the display will switch off after a period of inactivity. However, this would be inconvenient. Therefore, the application would disable the automatic switching off of the display.

Although the foregoing has been described with the position of different objects on the pitch being determined from the captured image, the invention is not so limited. For example, it is possible for each player to carry a device which provides the position of the player on the pitch using the GPS system. Moreover, a similar device could be placed in the ball. This would reduce the computational expense of the system as this information would be provided automatically without the need for the position to be calculated.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of annotating, on a display, a plurality of objects in an image of a scene captured by a camera, the method comprising:
   receiving i) metadata representing different annotations to be applied to each of the objects, and ii) position information identifying a real-world position of each object in the scene to which the annotations in the image are to be applied, the position information being based on the position of an image capture device having a field of view of the scene that is different from the camera;
   determining a focal length of the camera and a tilt applied to the camera;
   determining a position of the camera with respect to the scene being captured;
   identifying at least one of the objects in the image captured by the camera based on a comparison between the position of the camera and the position information;
   applying an annotation to the image captured by the camera in accordance with the at least one identified object and the position information,
   wherein the position information is determined from the image of the scene captured by the image capture device.

2. The method according to claim 1, wherein the identifying step further includes identifying at least one of the objects in the image captured by the camera in accordance with the received real-world position information of the object the focal length of the camera and the tilt applied to the camera.

3. The method according to claim 2, wherein the step of identifying the object includes detecting the object in the image.

4. The method according to claim 2, further comprising:
   identifying the object in accordance with a stored lens distortion characteristic of the camera.

5. The method according to claim 1, wherein the position information is global positioning system location information.

6. The method according to claim 1 wherein at least one object is either a static object located in the scene or a unique object in the scene.

7. The method according to claim 1, further comprising:
   storing the metadata and displaying the annotation from the stored metadata.

8. A non-transitory computer-readable medium storing computer readable instructions thereon which when executed by a computer cause the computer to perform a method according to claim 1.

9. The method according to claim 1, wherein the identifying step further includes identifying boundaries of a real-world position filmed by the camera based on the received real-world position information of the object, the focal length of the camera and the tilt applied to the camera.

10. An apparatus comprising:
    a display and a camera, the display configured to display an image of a scene having a plurality of objects, the image being captured by the camera;
    a receiving device configured to receive i) metadata representing different annotations to be applied to each of the objects, and ii) position information identifying a real-world position of each object in the scene to which the annotations in the image are to be applied, the position information being based on the position of an image capture device having a field of view of the scene that is different from the camera;
    a determining device configured to:
       determine a focal length of the camera and a tilt applied to the camera, and
       determine a position of the camera with respect to the scene being captured;
       identify at least one of the objects in the image captured by the camera based on a comparison between the position of the camera and the position information;
       apply an annotation to the image captured by the camera in accordance with at least one identified object and the position information; and
    wherein
       the position information is determined from the image of the scene captured by the image capture device.

11. The apparatus according to claim 10, wherein the controller is further configured to identify at least one of the objects in the image captured by the camera in accordance with the received real-world position information of the object, the focal length of the camera and the tilt applied to the camera.

12. The apparatus according to claim 11, wherein the controller is configured to detect the object in the image.

13. The apparatus according to claim 11, wherein the controller is further configured to identify the object in accordance with a stored lens distortion characteristic of the camera.

14. The apparatus according to claim 10, wherein the position information is global positioning system location information.

15. The apparatus according to claim 10 wherein at least one object is either a static object located in the scene or a unique object in the scene.

16. The apparatus according to claim 10, further comprising:
    a storage device configured to store the metadata,
    wherein the controller is operable to display the annotation from the stored metadata.

17. A mobile handset comprising:
    a transceiver configured to connect to a network; and
    the apparatus according to claim 10.

18. The method according to claim 9, wherein the identifying step further includes identifying the boundaries of the real-world position filmed by the camera by generating a three-dimensional vector based on the real-world position information, the focal length and the tilt, and computing an angle of horizontal and vertical fields of view of the camera.

* * * * *